(12) United States Patent
Müller et al.

(10) Patent No.: US 12,380,143 B2
(45) Date of Patent: *Aug. 5, 2025

(54) SYSTEMS AND METHODS FOR TRAINING LANGUAGE MODELS TO REASON OVER TABLES

(71) Applicant: Google LLC, Mountain View, CA (US)

(72) Inventors: Thomas Müller, Dietikon (CH); Jonathan Herzig, Tel Aviv (IL); Paweł Nowak, Zurich (CH); Julian Eisenschlos, Zurich (CH); Francesco Piccinno, Zurich (CH); Syrine Krichene, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,981

(22) Filed: Nov. 20, 2023

(65) Prior Publication Data

US 2024/0086436 A1    Mar. 14, 2024

Related U.S. Application Data

(63) Continuation of application No. 17/215,465, filed on Mar. 29, 2021, now Pat. No. 11,868,381.

(51) Int. Cl.
*G06F 16/3329* (2025.01)
*G06F 40/20* (2020.01)
(Continued)

(52) U.S. Cl.
CPC ......... *G06F 16/3329* (2019.01); *G06F 40/20* (2020.01); *G06F 40/284* (2020.01); *G06F 40/35* (2020.01); *G06N 3/08* (2013.01)

(58) Field of Classification Search
CPC .......... G06F 40/284; G06F 40/35; G06N 3/08
See application file for complete search history.

(56) References Cited

U.S. PATENT DOCUMENTS

2009/0226872 A1 * 9/2009 Gunther .................. G09B 7/00
434/350
2018/0157741 A1    6/2018 Allen et al.
(Continued)

OTHER PUBLICATIONS

Yu, Tao, et al. "Grappa: Grammar-augmented pre-training for table semantic parsing." arXiv preprint arXiv:2009.13845 (2020) (Year: 2020).*

(Continued)

*Primary Examiner* — Daniel C Washburn
*Assistant Examiner* — Athar N Pasha
(74) *Attorney, Agent, or Firm* — Botos Churchill IP Law LLP

(57) ABSTRACT

Systems and methods for pre-training and fine-tuning of neural-network-based language models to reason directly over tables without generating logical forms. In some examples, a language model can be pre-trained using masked-language modeling tasks synthetically generated from tables pulled from a knowledge corpus. In some examples, the language model may be further pre-trained using pairs of counterfactual statements generated from those tables, and/or one or more statements that compare selected data from those tables. The language model may then be fine-tuned using examples that include only a question, an answer, and a table, allowing fine-tuning examples to be harvested directly from existing benchmark datasets or synthetically generated.

22 Claims, 12 Drawing Sheets

(51) Int. Cl.
    *G06F 40/284*     (2020.01)
    *G06F 40/35*     (2020.01)
    *G06N 3/08*     (2023.01)

(56) References Cited

U.S. PATENT DOCUMENTS

| | | |
|---|---|---|
| 2019/0332769 A1 | 10/2019 | Fralick et al. |
| 2020/0293933 A1* | 9/2020 | Ghosh ............... G06F 18/15 |
| 2021/0056168 A1* | 2/2021 | Bull .................. G06F 40/211 |
| 2021/0125108 A1 | 4/2021 | Metzler et al. |
| 2021/0191962 A1* | 6/2021 | Qu .................... G06F 16/3344 |
| 2022/0044134 A1 | 2/2022 | Joy et al. |

OTHER PUBLICATIONS

Agarwal, Rishabh, et al., Learning to Generalize from Sparse and Underspecified Rewards, arXiv:1902.07198v1, Feb. 19, 2019, pp. 1-14.

Agarwal, Rishabh, et al., Learning to Generalize from Sparse and Underspecified Rewards, arXiv:1902.07198v2, Apr. 22, 2019, pp. 1-14.

Agarwal, Rishabh, et al., Learning to Generalize from Sparse and Underspecified Rewards, arXiv:1902.07198v3, May 24, 2019, pp. 1-14.

Agarwal, Rishabh, et al., Learning to Generalize from Sparse and Underspecified Rewards, arXiv:1902.07198v4, May 31, 2019, pp. 1-14.

Alberti, Chris, et al., Synthetic QA Corpora Generation with Roundtrip Consistency, Proceedings of the 57th Annual Meeting of the Association for Computational Linguistics, 2019, pp. 6168-6173.

Andor, Daniel, et al., Giving BERT a Calculator: Finding Operations and Arguments with Reading Comprehension, arXiv:1909.00109v1, Aug. 31, 2019, pp. 1-10.

Andor, Daniel, et al., Giving BERT a Calculator: Finding Operations and Arguments with Reading Comprehension, arXiv:1909.00109v2, Sep. 12, 2019, pp. 1-10.

Andor, Daniel, et al., Globally Normalized Transition-Based Neural Networks, arXiv:1603.06042v1, Mar. 19, 2016, pp. 1-11.

Andor, Daniel, et al., Globally Normalized Transition-Based Neural Networks, arXiv:1603.06042v2, Jun. 8, 2016, pp. 1-12.

Artzi, Yoav, et al., Weakly Supervised Learning of Semantic Parsers for Mapping Instructions to Actions, Transactions of the Association for Computational Linguistics, 2013, pp. 49-62.

Berant, Jonathan, et al., Semantic Parsing on Freebase from Question-Answer Pairs, Proceedings of the 2013 Conference on Empirical Methods in Natural Language Processing, pp. 1533-1544.

Bowman, Samuel, et al., A large annotated corpus for learning natural language inference, Proceedings of the 2015 Conference on Empirical Methods in Natural Language Processing, 2015, pp. 632-642.

Chang, Wei-Cheng, et al., Pre-Training Tasks for Embedding-Based Large-Scale Retrieval, arXiv:2002.03932x1. Feb. 10, 2020, pp. 1-12.

Chen, Wenhu, et al., Tabfact: a Large-Scale Dataset for Table Based Fact Verification, arXiv:1909.02164v3, Oct. 8, 2019, pp. 1-14.

Chen, Wenhu, et al., Tabfact: a Large-Scale Dataset for Tablebased Fact Verification, arXiv:1909.02164v1, Sep. 5, 2019, pp. 1-12.

Chen, Wenhu, et al., Tabfact: a Large-Scale Dataset for Table-Based Fact Verification, arXiv:1909.02164v2, Sep. 10, 2019, pp. 1-12.

Chen, Wenhu, et al., Tabfact: a Large-Scale Dataset for Table-Based Fact Verification, arXiv:1909.02164v4, Dec. 31, 2019, pp. 1-17.

Chen, Wenhu, et al., Tabfact: a Large-Scale Dataset for Table-Based Fact Verification, arXiv:1909.02164v5, Jun. 14, 2020, pp. 1-25.

Cho, Minseok, et al., Adversarial TableQA: Attention Supervision for Question Answering on Tables, arXiv:1810.08113v1, Oct. 18, 2018, Proceedings of Machine Learning Research 80:1-16, 2018.

Cho, Minseok, et al., Adversarial TableQA: Attention Supervision for Question Answering on Tables, arXiv:1810.08113v2, Oct. 19, 2018, pp. 1-16.

Clark, Christopher, et al., BoolQ: Exploring the Surprising Difficulty of Natural Yes/No. Questions, Proceedings of NAACL-HLT 2019, pp. 2924-2936.

Clark, Kevin, et al., Electra: Pre-Training Text Encoders as Discriminators Rather Than Generators, arXiv:2003.10555v1, Mar. 23, 2020, pp. 1-18.

Clark, Peter, et al., Project Aristo: Towards Machines that Capture and Reason with Science Knowledge. In Proceedings of the 10th International Conference on Knowledge Capture (K-CAP '19). Association for Computing Machinery, New York, NY, USA, 1-2.

Clarke, James, et al., Driving Semantic Parsing from the World's Response, Proceedings of the Fourteenth Conference on Computational Natural Language Learning, 2010, pp. 18-27.

Conneau, Alexis, et al., Supervised Learning of Universal Sentence Representations from Natural Language Inference Data, Proceedings of the 2017 Conference on Empirical Methods in Natural Language Processing, 2017, pp. 670-680.

Dagan, Ido, et al., Recognizing textual entailment: Rational, evaluation and approaches—Erratum, Natural Language Engineering 16 (1): 105, 2009, pp. 1-18.

Dagan, Ido, et al., The PASCAL Recognising Textual Entailment Challenge, MLCW 2005. Lecture Notes in Computer Science, vol. 3944, pp. 1-15.

Dagan, Ido, et al., "The PASCAL Recognising Textual Entailment Challenge", In: Quiñonero-Candela J., Dagan I., Magnini B., d'Alché-Buc F. (eds) Machine Learning Challenges. Evaluating Predictive Uncertainty, Visual Object Classification, and Recognising Tectual Entailment. MLCW 2005. Lect Notes in Comp Science, vol. 3944.

Dai, Andrew M., et al., Semi-supervised Sequence Learning, arXiv:1511.01432v1, Nov. 4, 2015, pp. 1-10.

Dai, Andrew M., et al., Semi-supervised Sequence Learning. In Proceedings of the 28th International Conference on Neural Information Processing Systems—vol. 2 (NIPS'15). MIT Press, Cambridge, MA, USA, 2015, pp. 3079-3087.

Dasigi, Pradeep, et al., Iterative Search for Weakly Supervised Semantic Parsing, Proceedings of NAACL-HLT 2019, pp. 2669-2680.

Devlin, Jacob, et al., BERT: Pre-training of Deep Bidirectional Transformers for Language Understanding, Proceedings of NAACL-HLT 2019, pp. 4171-4186.

Dodge, Jesse, et al., Show Your Work: Improved Reporting of Experimental Results, Proceedings of the 2019 Conference on Empirical Methods in Natural Language Processing and the 9th International Joint Conference on Natural Language Processing, pp. 2185-2194.

Dong, Li, et al., Language to Logical Form with Neural Attention, Proceedings of the 54th Annual Meeting of the Association for Computational Linguistics, 2016, pp. 33-43.

Dua, Dheeru, et al., DROP: A Reading Comprehension Benchmark Requiring Discrete Reasoning Over Paragraphs, Proceedings of NAACL-HLT 2019, pp. 2368-2378.

Eisenschlos, Julian, Learning to Reason Over Tables from Less Data, Google AI Blog, https://ai.googleblog.com/2021/01/learning-to-reason-over-tables-from.html, Jan. 29, 2021, pp. 1-6.

Eisenschlos, Julian Martin, et al., Understanding tables with intermediate pre-training, arXiv:2010.00571v1, Oct. 1, 2020, pp. 1-16.

Eisenschlos, Julian Martin, et al., Understanding tables with intermediate pre-training, arXiv:2010.00571v2, Oct. 5, 2021, pp. 1-16.

Gardner, Matt, et al., Evaluating Models' Local Decision Boundaries via Contrast Sets, arXiv:2004.02709v2, Oct. 1, 2020, pp. 1-17.

Gardner, Matt, et al., Evaluating NLP Models via Contrast Sets, arXiv::2004.02709v1, Apr. 6, 2020, pp. 1-16.

Geiger, Atticus, et al., Posing Fair Generalization Tasks for Natural Language Inference, Proceedings of the 2019 Conference on Empirical Methods in Natural Language Processing and the 9th International Joint Conference on Natural Language Processing, pp. 4485-4495.

Geva, Mor, et al., Injecting Numerical Reasoning Skills into Language Models, Proceedings of the 58th Annual Meeting of the Association for Computational Linguistics, 2020, pp. 946-958.

(56) References Cited

OTHER PUBLICATIONS

Golovin, Daniel, et al., Google Vizier: A Service for Black-Box Optimization, KDD 2017 Applied Data Science Paper, 2017, pp. 1487-1496.
Gupta, Vivek, et al., INFOTABS: Inference on Tables as Semi-structured Data, arXiv:2005.06117v1, pp. 1-16.
Gururangan, Suchin, et al., Don't Stop Pretraining: Adapt Language Models to Domains and Tasks, arXiv:2004.10964v1, Apr. 23, 2020, pp. 1-19.
Gururangan, Suchin, et al., Don't Stop Pretraining: Adapt Language Models to Domains and Tasks, arXiv:2004.10964v2, May 1, 2020, pp. 1-19.
Gururangan, Suchin, et al., Don't Stop Pretraining: Adapt Language Models to Domains and Tasks, arXiv:2004.10964v3, May 5, 2020, pp. 1-19.
Guu, Kelvin, et al., From Language to Programs: Bridging Reinforcement Learning and Maximum Marginal Likelihood, Proceedings of the 55th Annual Meeting of the Association for Computational Linguistics, 2017, pp. 1051-1062.
Haug, Till, et al., Neural Multi-Step Reasoning for Question Answering on Semi-Structured Tables, arXiv:1702.06589v1, Feb. 21, 2017, pp. 1-7.
Haug, Till, et al., Neural Multi-Step Reasoning for Question Answering on Semi-Structured Tables, arXiv:1702.06589v2, Mar. 22, 2018, pp. 1-7.
Henderson, Peter, et al., Deep Reinforcement Learning that Matters, The Thirty-Second AAAI Conference on Artificial Intelligence (AAAI-18), 2018 pp. 3207-3214.
Herzig, Jonathan, et al., Neural Semantic Parsing over Multiple Knowledge-bases, Proceedings of the 55th Annual Meeting of the Association for Computational Linguistics (Short Papers), 2017, pp. 623-628.
Herzig, Jonathan, et al., Open Domain Question Answering over Tables via Dense Retrieval, arXiv:2103.12011v1, Mar. 22, 2021, pp. 1-8.
Herzig, Jonathan, et al., TaPas: Weakly Supervised Table Parsing via Pre-training—ACL Anthology, 2020, pp. 1-25.
Herzig, Jonathan, et al., TAPAS: Weakly Supervised Table Parsing via Pre-training, arXiv:2004.02349v1, Apr. 6, 2020, pp. 1-14.
Herzig, Jonathan, et al., TAPAS: Weakly Supervised Table Parsing via Pre-training, arXiv:2004.02349v2, Apr. 21, 2020, pp. 1-14.
Howard, Jeremy, et al., Universal Language Model Fine-tuning for Text Classification, Proceedings of the 56th Annual Meeting of the Association for Computational Linguistics (Long Papers), 2018, pp. 328-339.
Huber, Peter J., Robust Estimation of a Location Parameter, The Annals of Mathematical Statistics, 1963, pp. 73-101.
Hwang, Wonseok, et al., A Comprehensive Exploration on WikiSQL with Table-Aware Word Contextualization, arXiv:1902.01069v1, Feb. 4, 2019, pp. 1-30.
Hwang, Wonseok, et al., A Comprehensive Exploration on WikiSQL with Table-Aware Word Contextualization, arXiv:1902.01069v2, Nov. 11, 2019, pp. 1-34.
Iyer, Shankar, et al., First Quora Dataset Release: Question Pairs, Machine Learning Platform Engineer at Quora, 2017, pp. 1-3.
Iyer, Srinivasan, et al., Learning a Neural Semantic Parser from User Feedback, Proceedings of the 55th Annual Meeting of the Association for Computational Linguistics, 2017, pp. 963-973.
Iyyer, Mohit, et al., Search-based Neural Structured Learning for Sequential Question Answering, Proceedings of the 55th Annual Meeting of the Association for Computational Linguistics, 2017, pp. 1821-1831.
Jia, Robin, et al., Data Recombination for Neural Semantic Parsing, Proceedings of the 54th Annual Meeting of the Association for Computational Linguistics, 2016, pp. 12-22.
Jo, Saehan, et al., AggChecker: A FactChecking System for Text Summaries of Relational Data Sets, Proceedings of the VLDB Endowment, vol. 12, No. 12, pp. 1938-1941.
Kaushik, Divyansh, et al., Learning the Difference that Makes a Difference with Counterfactually-Augmented Data, Published as a conference paper at ICLR 2020, pp. 1-17.
Khashabi, Daniel, et al., Question Answering via Integer Programming over Semi-Structured Knowledge, Proceedings of the Twenty-Fifth International Joint Conference on Artificial Intelligence (IJCAI-16), 2016, pp. 1145-1152.
Kiss, Tibor, et al., Unsupervised Multilingual Sentence Boundary Detection, Association for Computational Linguistics, vol. 32, No. 4, 2006, pp. 1-42.
Lafferty, John, et al., Conditional Random Fields: Probabilistic Models for Segmenting and Labeling Sequence Data, University of Pennsylvania, Dept. of Computer & Information Science, 2001, pp. 1-10.
Lample, Guillaume, et al., Cross-lingual Language Model Pretraining, arXiv:1901.07291v1, Jan. 22, 2019, pp. 1-10.
Lawrence, Carolin, et al., Improving a Neural Semantic Parser by Counterfactual Learning from Human Bandit Feedback, Proceedings of the 56th Annual Meeting of the Association for Computational Linguistics (Long Papers), 2018, pp. 1820-1830.
Lee, Kenton, et al., Latent Retrieval for Weakly Supervised Open Domain Question Answering, Proceedings of the 57th Annual Meeting of the Association for Computational Linguistics, 2019, pp. 6086-6096.
Leonandya, Rezka, et al., The Fast and the Flexible: Training Neural Networks to Learn to Follow Instructions from Small Data, pp. 1-12.
Lewis, Patrick, et al., Unsupervised Question Answering by Cloze Translation, Proceedings of the 57th Annual Meeting of the Association for Computational Linguistics, 2019, pp. 4896-4910.
Liang, Percy, et al., Learning Dependency-Based Compositional Semantics, Proceedings of the 49th Annual Meeting of the Association for Computational Linguistics, 2011, pp. 590-599.
Liang, Chen, et al., Memory Augmented Policy Optimization for Program Synthesis and Semantic Parsing, 32nd Conference on Neural Information Processing Systems, 2018, pp. 1-13.
Liu, Yinhan, et al., RoBERTa: A Robustly Optimized BERT Pretraining Approach, arXiv:1907.11692v1, Jul. 26, 2019, pp. 1-13.
Loper, Edward, et al., NLTK: The Natural Language Toolkit, In Proceedings of the ACL-02 Workshop on Effective tools and methodologies for teaching natural language processing and computational linguistics—vol. 1 (ETMTNLP '02). Assoc for computational Linguistics, 2002, 63-70.
Lu, Jiasen, et al., ViLBERT: Pretraining Task-Agnostic Visiolinguistic Representations for Vision-and-Language Tasks, arXiv:1908.02265v1, Aug. 6, 2019, pp. 1-11.
Mikolov, Tomas, et al., Distributed Representations of Words and Phrases and their Compositionality, NIPS, 2013, pp. 1-9.
Min, Sewon, et al., A Discrete Hard EM Approach for Weakly Supervised Question Answering, Proceedings of the 2019 Conference on Empirical Methods in Natural Language Processing, pp. 2851-2864.
Mueller, Thomas, et al., GitHub—google-research/tapas: End-to-end neural table-text understanding models, https://github.com/google-research/tapas, downloaded from the internet Feb. 26, 2021, pp. 1-14.
Muhlgay, Dor, et al., Value-based Search in Execution Space for Mapping Instructions to Programs, Proceedings of NAACL-HLT 2019, pp. 1942-1954.
Muller, Thomas, et al., Answering Conversational Questions on Structured Data without Logical Forms, arXiv:1908.11787v1, Aug. 30, 2019, pp. 1-9.
Muller, Thomas, et al., Answering Conversational Questions on Structured Data without Logical Forms, Proceedings of the 2019 Conference on Empirical Methods in Natural Language Processing and the 9th International Joint Conference on Natural Language Processing, pp. 5902-5910.
Neelakantan, Arvind, et al., Learning a Natural Language Interface With Neural Programmer, arXiv:1611,08945v1v, Nov. 28, 2016, pp. 1-10.
Neelakantan, Arvind, et al., Learning a Natural Language Interface With Neural Programmer, arXiv:1611.08945v2, Feb. 20, 2017, pp. 1-13.

(56) References Cited

OTHER PUBLICATIONS

Neelakantan, Arvind, et al., Learning a Natural Language Interface With Neural Programmer, arXiv:1611.08945v3, Feb. 21, 2017, pp. 1-13.

Neelakantan, Arvind, et al., Learning a Natural Language Interface With Neural Programmer, arXiv:1611.08945v4, Mar. 2, 2017, pp. 1-13.

Neelakantan, Arvind, et al., Neural Programmer: Inducing Latent Programs With Gradient Descent, arXiv:1511.04834v1, Nov. 16, 2015, pp. 1-17.

Neelakantan, Arvind, et al., Neural Programmer: Inducing Latent Programs With Gradient Descent, arXiv:1511.04834v2, Mar. 1, 2016, pp. 1-17.

Neelakantan, Arvind, et al., Neural Programmer: Inducing Latent Programs With Gradient Descent, arXiv:1511.04834v3, Aug. 4, 2016, pp. 1-18.

Niven, Timothy, et al., Probing Neural Network Comprehension of Natural Language Arguments, Proceedings of the 57th Annual Meeting of the Association for Computational Linguistics, 2019, pp. 4658-4664.

Pasupat, Panupong, et al., Compositional Semantic Parsing on Semi-Structured Tables, Proceedings of the 53rd Annual Meeting of the Association for Computational Linguistics and the 7th International Joint Conference on Natural Language Processing, 2015, pp. 1470-1480.

Peters, Matthew E., et al., Deep contextualized word representations, Proceedings of NAACL-HLT 2018, pp. 2227-2237.

Pruksachatkun, Yada, et al., Intermediate-Task Transfer Learning with Pretrained Models for Natural Language Understanding: When and Why Does It Work?, arXiv:2005.00628v1, May 1, 2020, pp. 1-17.

Pruksachatkun, Yada, et al., Intermediate-Task Transfer Learning with Pretrained Models for Natural Language Understanding: When and Why Does It Work?, arXiv:2005.00628v2, May 9, 2020, pp. 1-17.

Radford, Alec, et al., Improving Language Understanding by Generative Pre-Training.

Ran, Qiu, et al., NumNet: Machine Reading Comprehension with Numerical Reasoning, Proceedings of the 2019 Conference on Empirical Methods in Natural Language Processing and the 9th International Joint Conference on Natural Language Processing, pp. 2474-2484.

Salvatore, Felipe, et al., A logical-based corpus for cross-lingual evaluation, Proceedings of the 2nd Workshop on Deep Learning Approaches for Low-Resource NLP (DeepLo), 2019, pp. 22-30.

Sammons, Mark, et al., "Ask not what Textual Entailment can do for You . . . ", Proceedings of the 48th Annual Meeting of the Association for Computational Linguistics, 2010, pp. 1199-1208.

Sellam, Thibault, et al., BLEURT: Learning Robust Metrics for Text Generation, arXiv:2004.04696v3, May 14, 2020, pp. 1-12.

Sellam, Thibault, et al., BLEURT: Learning Robust Metrics for Text Generation, arXiv:2004.04696v4, May 20, 2020, pp. 1-12.

Sellam, Thibault, et al., BLEURT: Learning Robust Metrics for Text Generation, arXiv:2004.04696v5, May 21, 2020, pp. 1-12.

Sellam, Thibault, et al., BLEURT: Learning Robust Metrics for Text Generation, arXiv:2004.0469v1, Apr. 9, 2020, pp. 1-12.

Sellam, Thibault, et al., BLEURT: Learning Robust Metrics for Text Generation, arXv:2004.04696v2, May 11, 2020, pp. 1-12.

Socher, Richard, et al., Parsing with Compositional Vector Grammars, Proceedings of the 51st Annual Meeting of the Association for Computational Linguistics, 2013, pp. 455-465.

Su, Yu, et al., Cross-domain Semantic Parsing via Paraphrasing, Proceedings of the 2017 Conference on Empirical Methods in Natural Language Processing, pp. 1235-1246.

Subramanian, Sandeep, et al., Learning General Purpose Distributed Sentence Representations via Large Scale Multi-Task Learning, Published as a conference paper at ICLR 2018, pp. 1-16.

Suhr, Alane, et al., A Corpus for Reasoning About Natural Language Grounded in Photographs, Proceedings of the 57th Annual Meeting of the Association for Computational Linguistics, 2019, pp. 6418-6428.

Suhr, Alane, et al., A Corpus of Natural Language for Visual Reasoning, Proceedings of the 55th Annual Meeting of the Association for Computational Linguistics (Short Papers), 2017, pp. 217-223.

Sun, Yibo, et al., Knowledge-Aware Conversational Semantic Parsing Over Web Tables, arXiv:1809.04271v1, Sep. 12, 2018, pp. 1-9.

Tan, Hao, et al., LXMERT: Learning Cross-Modality Encoder Representations from Transformers, Proceedings of the 2019 Conference on Empirical Methods in Natural Language Processing and the 9th International Joint Conference on Natural Language Processing, pp. 5100-5111.

Vaswani, Ashish, et al., Attention Is All You Need, 31st Conference on Neural Information Processing Systems (NIPS 2017), pp. 1-11.

Vlachos, Andreas, et al., Identification and Verification of Simple Claims about Statistical Properties, Proceedings of the 2015 Conference on Empirical Methods in Natural Language Processing, 2015, pp. 2596-2601.

Wallace, Eric, et al., Do NLP Models Know Numbers? Probing Numeracy in Embeddings, arXiv:1909.07940v1, Sep. 17, 2019, pp. 1-12.

Wallace, Eric, et al., Do NLP Models Know Numbers? Probing Numeracy in Embeddings, arXiv:1909.07940v2, Sep. 18, 2019, pp. 1-12.

Wallace, Eric, et al., Do NLP Models Know Numbers? Probing Numeracy in Embeddings, Proceedings of the 2019 Conference on Empirical Methods in Natural Language Processing and the 9th International Joint Conference on Natural Language Processing, 2019, pp. 5307-5315.

Wang, Yushi, et al., Building a Semantic Parser Overnight, Proceedings of the 53rd Annual Meeting of the Association for Computational Linguistics and the 7th International Joint Conference on Natural Language Processing, 2015, pp. 1332-1342.

Wang, Bailin, et al., Learning Semantic Parsers from Denotations with Latent Structured Alignments and Abstract Programs, Proceedings of the 2019 Conference on Empirical Methods in Natural Language Processing, pp. 3774-3785.

Wang, Dan, et al., Multi-view 3D Reconstruction with Transformer, arXiv:2103.12957v1, Mar. 24, 2021, pp. 1-14.

Weir, Nathaniel, et al., DBPal: A Fully Pluggable NL2SQL Training Pipeline, Research 26: Usability and Language User Interfaces, SIGMOD 2020, pp. 2347-2361.

Wu, Changxing, et al., Bilingually-constrained Synthetic Data for Implicit Discourse Relation Recognition, Proceedings of the 2016 Conference on Empirical Methods in Natural Language Processing, pp. 2306-2312.

Xiong, Wenhan, et al., Pretrained Encyclopedia: Weakly Supervised Knowledge-Pretrained Language Model, Published as a conference paper at ICLR 2020, pp. 1-13.

Yin, Pengcheng, et al., Neural Enquirer: Learning to Query Tables in Natural Language, Proceedings of 2016 NAACL Human-Computer Question Answering Workshop, 2016, pp. 29-35.

Yin, Pencheng, et al., TABERT: Pretraining for Joint Understanding of Textual and Tabular Data.

Zhang, Yuchen, et al., Macro Grammars and Holistic Triggering for Efficient Semantic Parsing, Proceedings of the 2017 Conference on Empirical Methods in Natural Language Processing, 2017, pp. 1214-1223.

Zhong, Wanjun, et al., LogicalFactChecker: Leveraging Logical Operations for Fact Checking with Graph Module Network, arXiv:2004.13659v1, Apr. 28, 2020, pp. 1-13.

Zhong, Victor, et al., Seq2SQL: Generating Structured Queries from Natural Language using Reinforcement Learning, arXiv:1709.00103v1, Aug. 31, 2017, pp. 1-13.

Zhong, Victor, et al., SEQ2SQL: Generating Structured Queries From Natural Language Using Reinforcement Learning, arXiv:1709.00103v2, Sep. 20, 2017, pp. 1-12.

(56) References Cited

OTHER PUBLICATIONS

Zhong, Victor, et al., SEQ2SQL: Generating Structured Queries From Natural Language Using Reinforcement Learning, arXiv:1709.00103v3, Oct. 18, 2017, pp. 1-12.
Zhong, Victor, et al., SEQ2SQL: Generating Structured Queries From Natural Language Using Reinforcement Learning, arXiv:1709.00103v4, pp. 1-12.
Zhong, Victor, et al., SEQ2SQL: Generating Structured Queries From Natural Language Using Reinforcement Learning, arXiv:1709.00103v5, Oct. 31, 2017, pp. 1-12.
Zhong, Victor, et al., SEQ2SQL: Generating Structured Queries From Natural Language Using Reinforcement Learning, arXiv:1709.00103v6, Nov. 7, 2017, pp. 1-12.
Zhong, Victor, et al., SEQ2SQL: Generating Structured Queries From Natural Language Using Reinforcement Learning, arXiv:1709.00103v7, Nov. 9, 2017, pp. 1-12.

* cited by examiner

FIG. 3A

| Rank | Breed |
|---|---|
| 1 | Labrador Retriever |
| 2 | German Shepherd |
| 3 | Golden Retriever |

302: List of most popular dog breeds

FIG. 3B

Masked-Language Modeling Task

| | [CLS] | list | of | most | pop | ##ular | [MASK] | breed | ##s | [SEP] | rank | [MASK] | 1 | lab | ##rador | re | ##triever | 2 | german | shepherd | 3 | gold | ##en | re | ##triever |
|---|---|---|---|---|---|---|---|---|---|---|---|---|---|---|---|---|---|---|---|---|---|---|---|---|---|
| Token Embeddings | $T_{[CLS]}$ | $T_{list}$ | $T_{of}$ | $T_{most}$ | $T_{pop}$ | $T_{\#\#ular}$ | $T_{[MASK]}$ | $T_{breed}$ | $T_{\#\#s}$ | $T_{[SEP]}$ | $T_{rank}$ | $T_{[MASK]}$ | $T_1$ | $T_{lab}$ | $T_{\#\#rador}$ | $T_{re}$ | $T_{\#\#triever}$ | $T_2$ | $T_{german}$ | $T_{shepherd}$ | $T_3$ | $T_{gold}$ | $T_{\#\#en}$ | $T_{re}$ | $T_{\#\#triever}$ |
| Position Embeddings | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Segment Embeddings | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |
| Column Embeddings | 0 | 0 | 0 | 0 | 0 | 0 | 0 | 0 | 0 | 0 | 1 | 2 | 1 | 2 | 2 | 2 | 2 | 1 | 2 | 2 | 1 | 2 | 2 | 2 | 2 |
| Row Embeddings | 0 | 0 | 0 | 0 | 0 | 0 | 0 | 0 | 0 | 0 | 0 | 0 | 1 | 1 | 1 | 1 | 1 | 2 | 2 | 2 | 3 | 3 | 3 | 3 | 3 |
| Rank Embeddings | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Rank | Breed | Average Weight (lbs) |
|---|---|---|
| 1 | Labrador Retriever | 80 |
| 2 | German Shepherd | 85 |
| 3 | Golden Retriever | 75 |

| # | Question | Answer | Example Type |
|---|---|---|---|
| 1 | Which of the top three dog breeds is the heaviest on average? | German Shepherd | Cell Selection |
| 2 | What is the average weight in pounds of the top two most popular dog breeds? | 82.5 (AVERAGE(80, 85)) | Scalar Answer |
| 3 | How many of the top three dog breeds are a type of retriever? | 2 (COUNT(Labrador Retriever, Golden Retriever)) | Ambiguous |
| 4 | What is the popularity rank of the German Shepherd? | 2 | Ambiguous |
| 5-1 | What is the most popular dog breed? | Labrador Retriever | Cell Selection |
| 5-2 | What is its average weight in pounds? | 80 | Ambiguous |

602 — Language model generates a probability $p_{col}(co)$ for each given column $co$ in the table, and selects the column $Y$ with the greatest probability value

604 — Language model generates a probability value $p_{cell}(c)$ for every cell $c$ in column $Y$

606 — Language model generates a probability value $p_a(op_i)$ for every aggregation option in a preselected set of aggregation options

608 — Processing system generates a first loss value $J_{column}$ based on the $p_{col}(co)$ values for each column $co$, and the column identifier $A_y$ of the answer

610 — Processing system generates a second loss value $J_{cells}$ based on the $p_{cell}(c)$ values for each cell $c$ in column $Y$, and the table coordinates $A$ of the answer

612 — Processing system generates a third loss value $J_{aggr}$ based on the $p_a(op_0)$ value representing the model's prediction of whether the "no aggregation" option should be used to answer the fine-tuning example

614 — Processing system generates a total loss value $J_{CS}$ based on the first, second, and third loss values

616 — Processing system modifies one or more parameters of the language model based on the total loss value $J_{CS}$

| Rank [0] | Breed [0] | Average Weight (lbs) [0] |
|---|---|---|
| 1 [0] | Labrador Retriever [0] | 80 [0.9] |
| 2 [0] | German Shepherd [0] | 85 [0.9] |
| 3 [0] | Golden Retriever [0] | 75 [0.2] |

| op | $\hat{p}_a(op)$ | compute(op, $p_{cells}$, T) | $\hat{p}_a(op)$ * compute(op, $p_{cells}$, T) |
|---|---|---|---|
| COUNT | 0.1 | $(1 \times 0.9) + (1 \times 0.9) + (1 \times 0.2) = 2$ | $(0.1 \times 2) = 0.2$ |
| SUM | 0.1 | $(80 \times 0.9) + (85 \times 0.9) + (75 \times 0.2) = 163.5$ | $(0.1 \times 163.5) = 16.35$ |
| AVERAGE | 0.8 | $(163.5 / 2) = 81.75$ | $(0.8 \times 81.75) = 65.4$ |
| - | - | - | $S_{est} = 0.2 + 16.35 + 65.4 = 81.95$ |

SYSTEMS AND METHODS FOR TRAINING LANGUAGE MODELS TO REASON OVER TABLES

CROSS REFERENCE TO RELATED APPLICATIONS

This application is a continuation of U.S. application Ser. No. 17/215,465, filed Mar. 29, 2021, the disclosure of which is incorporated herein by reference.

BACKGROUND

Natural language processing ("NLP") models may be trained to answer questions based on tables. Some methods, referred to as semantic processing methods, focus on training the model to translate a question into a logical form that can be used to query a table for the answer. For example, an NLP model may be trained to translate a question into one or more SQL queries, which are then used to obtain data from an SQL database which in turn is used in formulating an answer. Training a model to reliably translate questions into logical forms generally requires supervised training data that pairs natural language questions with logical forms. Creating such supervised training data is labor intensive, making it expensive and difficult to obtain enough training data to sufficiently train a model. Although an NLP model can, in theory, be trained to generate logical forms using weak supervision (e.g., where a training example consists of a question and its answer (but no logical form)), such methods can result in the model generating forms which are spurious (e.g., not syntactically correct, seeking information fields which do not exist in the table, etc.). In addition, because a model trained with weakly supervised question-answer pairs has no way of discerning between a relevant logical form that returns the correct answer and an irrelevant logical form that only accidentally returns the correct answer, the model can learn false associations that cause it to perform unpredictably during inference. The present technology presents an alternative to such semantic parsing methods.

BRIEF SUMMARY

The present technology relates to systems and methods for pre-training and fine-tuning of neural-network-based language models. More particularly, the present technology provides systems and methods for training a language model to reason directly over tables without generating logical forms. In that regard, the present technology can be based on any suitable language model architecture such as a BERT (Bidirectional Encoder Representations from Transformers) or T5 (Text-to-Text Transfer Transformer) model. The language model can be pre-trained using masked-language modeling tasks ("MLM tasks") synthetically generated from tables pulled from an unlabeled knowledge corpus (e.g., one or more online encyclopedias). In some aspects, the language model may also be further pre-trained using pairs of counterfactual statements generated from those tables, and/or one or more statements that compare selected data from those tables. The language model is then fine-tuned using training examples that only include a question, answer, and table.

For each fine-tuning example, the language model uses the question and answer to predict either the cell of the table that contains the answer, or a set of two or more cells of the table and an appropriate aggregating function which together can be used to provide the answer. As each fine-tuning example only requires a question, an answer, and a table, the present technology enables pre-training to be fully completed using examples from existing benchmark datasets (e.g., WikiTQ, SQA, WikiSQL). Likewise, this simplified fine-tuning approach makes it feasible to create synthetic fine-tuning examples by parsing documents containing tables from any knowledge corpus (e.g., pages or portions thereof from any online encyclopedia or other website containing tables). Models trained according to the present technology can thus have a simpler architecture than semantic processing models and can be fully fine-tuned on existing benchmark data sets and/or synthetic training examples, while also meeting or exceeding the accuracy and transferability of semantic processing models.

In one aspect, the disclosure describes a computer-implemented method of training a language model, comprising: pre-training the language model, using one or more processors of a processing system, based on a plurality of pre-training examples each comprising a table; and fine-tuning the language model, using the one or more processors, based on a plurality of fine-tuning examples each comprising a question, an answer, and a table; wherein, for a first fine-tuning example comprising a first question, a first table, and a first answer that is a scalar, the fine-tuning comprises: (a) generating an estimated answer to the first question based on: the first table; the language model's predictions of whether an answer to the first question may be based on each cell of a plurality of cells of the first table; and the language model's predictions of whether an answer to the first question may be based on each aggregation operation of a plurality of aggregation operations; (b) generating a first loss value based on the estimated answer; (c) generating a second loss value based on the language model's predictions of whether an answer to the first question may be based on each aggregation operation of a plurality of aggregation operations; and (d) modifying one or more parameters of the language model based at least on the first and second loss values. In some aspects, for a second fine-tuning example comprising a second question, a second table, and a second answer that occurs in a cell of the second table, the fine-tuning comprises: (e) generating a third loss value based on the language model's prediction of whether an answer to the second question can be found in a single cell of the second table; (f) generating a fourth loss value based on the language model's predictions of whether each cell of a plurality of cells of the second table contains an answer to the second question; and (g) modifying one or more parameters of the language model based at least on the third and fourth loss values. In some aspects, the plurality of cells of the first table is all cells of the first table, or all cells of a given column of the first table; and the plurality of cells of the second table is all cells of the second table, or all cells of a given column of the second table. In some aspects, for the second fine-tuning example, the fine-tuning further comprises: (h) generating a fifth loss value based on the language model's prediction of whether an answer to the second question can be found in a single column of the second table; and (i) modifying the one or more parameters of the language model based at least on the third, fourth, and fifth loss values. In some aspects, for a third fine-tuning example comprising a third question, a third table, and a third answer that is a scalar and occurs in a cell of the third table, the fine-tuning comprises: (h) generating, using the language model, a first prediction of whether an answer to the third question can be found in a single cell of the third table; (i) generating, using the language model, a set of second predictions of whether an answer to the third question may be based on each aggregation operation of a plurality of aggregation operations; and (j) determining, based on the first prediction and the set of second predictions, whether to generate: a sixth loss value based on the language model's first prediction; and a seventh loss value based on the language model's predictions of whether each cell of a plurality of cells of the third table contains an answer to the third question. In some aspects, the method further comprises generating the sixth loss value and the seventh loss value based on the first prediction being greater than each of the second predictions in the set of second predictions. In some aspects, the method further comprises generating the sixth loss value and the seventh loss value based on the first prediction being greater than a sum of all second predictions in the set of the second predictions. In some aspects, the method further comprises generating the sixth loss value and the seventh loss value based on the first prediction being greater than a predetermined threshold value. In some aspects, the method further comprises generating, using the one or more processors, a plurality of masked language modeling tasks each comprising a table, a portion of text from a document, and one or more mask tokens; and pre-training the language model based on a plurality of pre-training examples comprises, for a given masked language modeling task of the plurality of masked language modeling tasks: generating a masked language modeling loss value based on the language model's predictions regarding each mask token of the given masked language modeling task; and modifying one or more parameters of the language model based at least on the masked language modeling loss value. In some aspects, the method further comprises generating, using the one or more processors, a plurality of counterfactual examples each comprising a table, a first statement, and a second statement; and pre-training the language model based on a plurality of pre-training examples comprises, for a given counterfactual example of the plurality of counterfactual examples: generating a positive statement loss value based on the language model's prediction of whether the first statement is entailed in the table of the given counterfactual example; generating a negative statement loss value based on the language model's prediction of whether the second statement is refuted by the table of the given counterfactual example; and modifying one or more parameters of the language model based at least on the positive statement loss value and the negative statement loss value.

In another aspect, the disclosure describes a processing system for training a language model, comprising: a memory; and one or more processors coupled to the memory and configured to: pre-train the language model based on a plurality of pre-training examples each comprising a table; and fine-tune the language model based on a plurality of fine-tuning examples each comprising a question, an answer, and a table; wherein, to fine-tune the language model, the one or more processors are further configured to, for a first fine-tuning example comprising a first question, a first table, and a first answer that is a scalar: (a) generate an estimated answer to the first question based on: the first table; the language model's predictions of whether an answer to the first question may be based on each cell of a plurality of cells of the first table; and the language model's predictions of whether an answer to the first question may be based on each aggregation operation of a plurality of aggregation operations; (b) generate a first loss value based on the estimated answer; (c) generate a second loss value based on the language model's predictions of whether an answer to the first question may be based on each aggregation operation of a plurality of aggregation operations; and (d) modify one or more parameters of the language model based at least on the first and second loss values. In some aspects, to fine-tune the language model, the one or more processors are further configured to, for a second fine-tuning example comprising a second question, a second table, and a second answer that occurs in a cell of the second table: (e) generate a third loss value based on the language model's prediction of whether an answer to the second question can be found in a single cell of the second table; (f) generate a fourth loss value based on the language model's predictions of whether each cell of a plurality of cells of the second table contains an answer to the second question; and (g) modify one or more parameters of the language model based at least on the third and fourth loss values. In some aspects, the plurality of cells of the first table is all cells of the first table, or all cells of a given column of the first table; and the plurality of cells of the second table is all cells of the second table, or all cells of a given column of the second table. In some aspects, to fine-tune the language model based on the second fine-tuning example, the one or more processors are further configured to: (h) generate a fifth loss value based on the language model's prediction of whether an answer to the second question can be found in a single column of the second table; and (i) modify the one or more parameters of the language model based at least on the third, fourth, and fifth loss values. In some aspects, to fine-tune the language model, the one or more processors are further configured to, for a third fine-tuning example comprising a third question, a third table, and a third answer that is a scalar and occurs in a cell of the third table: (h) generate, using the language model, a first prediction of whether an answer to the third question can be found in a single cell of the third table; (i) generate, using the language model, a set of second predictions of whether an answer to the third question may be based on each aggregation operation of a plurality of aggregation operations; and (j) determine, based on the first prediction and the set of second predictions, whether to generate: a sixth loss value based on the language model's first prediction; and a seventh loss value based on the language model's predictions of whether each cell of a plurality of cells of the third table contains an answer to the third question. In some aspects, to fine-tune the language model based on the third fine-tuning example, the one or more processors are further configured to generate the sixth loss value and the seventh loss value based on the first prediction being greater than each of the second predictions in the set of second predictions. In some aspects, to fine-tune the language model based on the third fine-tuning example, the one or more processors are further configured to generate the sixth loss value and the seventh loss value based on the first prediction being greater than a sum of all second predictions in the set of the second predictions. In some aspects, to fine-tune the language model based on the third fine-tuning example, the one or more processors are further configured to generate the sixth loss value and the seventh loss value based on the first prediction being greater than a predetermined threshold value. In some aspects, the one or more processors are further configured to generate a plurality of masked language modeling tasks each comprising a table, a portion of text from a document, and one or more mask tokens; and the one or more processors being configured to pre-train the language model based on a plurality of pre-training examples comprises, for a given masked language modeling task of the plurality of masked language modeling tasks, being configured to: generate a masked language modeling loss value based on the language model's predictions regarding each mask token of the given masked language modeling task; and modify one or more parameters of the language model based at least on the masked language modeling loss value. In some aspects, the one or more processors are further configured to generate a plurality of counterfactual examples each comprising a table, a first statement, and a second statement; and the one or more processors being configured to pre-train the language model based on a plurality of pre-training examples comprises, for a given counterfactual example of the plurality of counterfactual examples, being configured to: generate a positive statement loss value based on the language model's prediction of whether the first statement is entailed in the table of the given counterfactual example; generate a negative statement loss value based on the language model's prediction of whether the second statement is refuted by the table of the given counterfactual example; and modify one or more parameters of the language model based at least on the positive statement loss value and the negative statement loss value.

BRIEF DESCRIPTION OF THE DRAWINGS

FIGS. 3A and 3B show an exemplary text snippet and table snippet, an associated masked language modeling task, and associated embeddings, in accordance with aspects of the disclosure.

FIGS. 5A and 5B show an exemplary table and set of exemplary question-answer pairs for use in fine-tuning the language model, in accordance with aspects of the disclosure.

FIG. 6 is a flow diagram of an exemplary method of processing a "cell selection" fine-tuning example, in accordance with aspects of the disclosure.

FIGS. 8A and 8B show an exemplary table, and the probability values and computations used to generate a predicted scalar answer, in accordance with aspects of the disclosure.

DETAILED DESCRIPTION

The present technology will now be described with respect to the following exemplary systems and methods.

Example Systems

Figure 1:
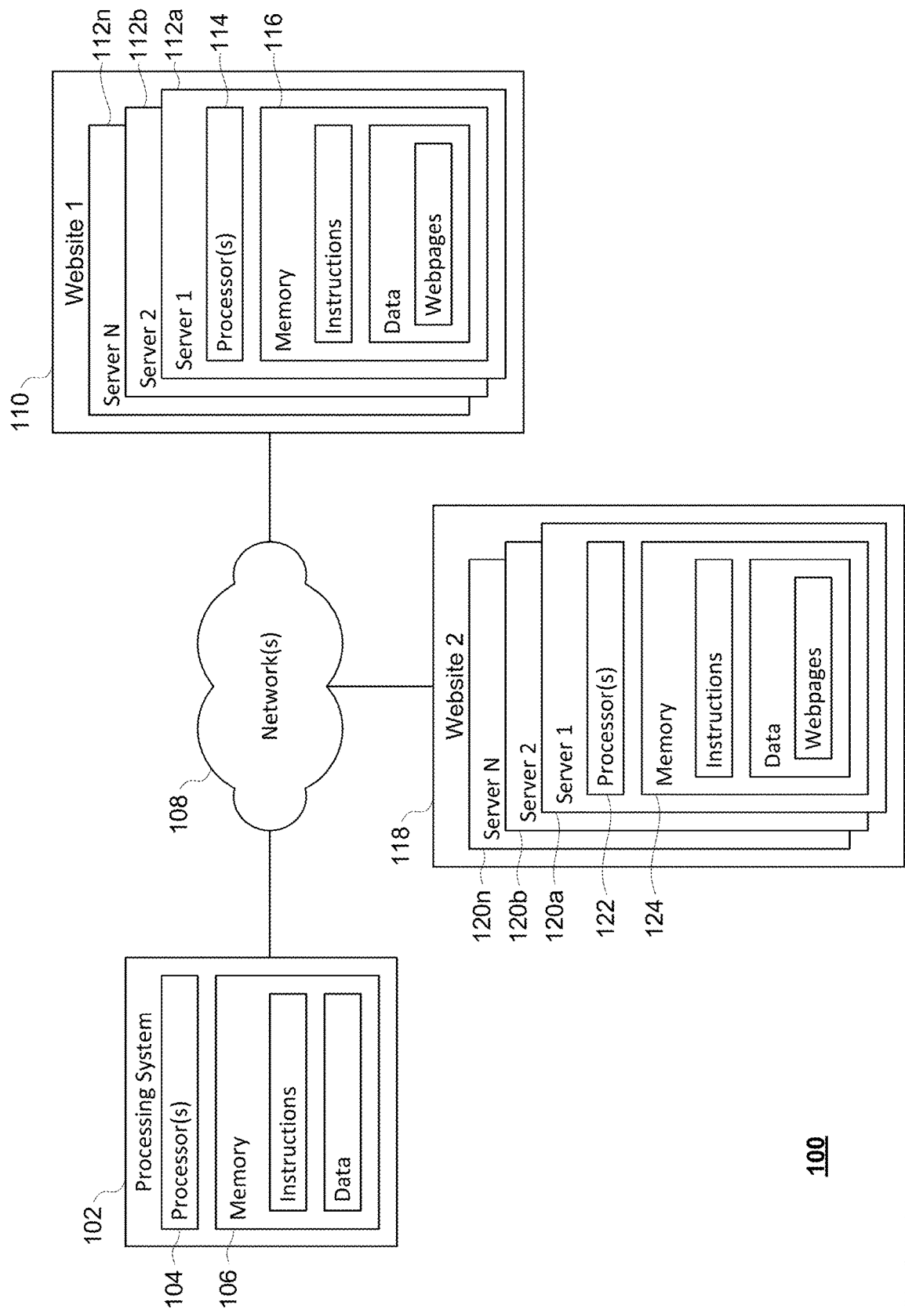
FIG. 1 is a functional diagram of an example system in accordance with aspects of the disclosure.

FIG. 1 schematically illustrates an arrangement 100 with an exemplary processing system 102 for performing the methods described herein. The processing system 102 includes one or more processors 104 and memory 106 storing instructions and data. In addition, the instructions and data may include the language model, knowledge corpus, and/or training data described herein. As shown in FIG. 1, the processing system 102 may be in communication with various websites, including websites 110 and 118, over one or more networks 108. Exemplary websites 110 and 118 each include one or more servers 112a-112n and 120a-n, respectively. Each of the servers 112a-112n and 120a-n may have one or more processors (e.g., 114 and 122), and associated memory (e.g., 116 and 124) storing instructions and data, including the HTML of one or more webpages. The knowledge corpus used to create pre-training and/or fine-tuning examples may be comprised of one or more such websites. However, various other topologies are also possible. For example, the processing system 102 may not be in direct communication with the websites, and may instead retrieve documents from stored versions of one or more websites. In other implementations, rather than websites or stored versions thereof, the knowledge corpus may comprise one or more other sources of information such as databases, copies of literature, publications, newspapers, reference books, etc.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions and data that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA, PYTHON, or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

In addition to the systems described above and illustrated in the figures, various operations will now be described.

Pre-Training

According to aspects of the technology, a neural-network-based language model resident on processing system 102 is pre-trained using masked language modeling tasks. Each masked language modeling task may be automatically retrieved and/or generated by the processing system 102, allowing pre-training to proceed unsupervised.

Figure 2:
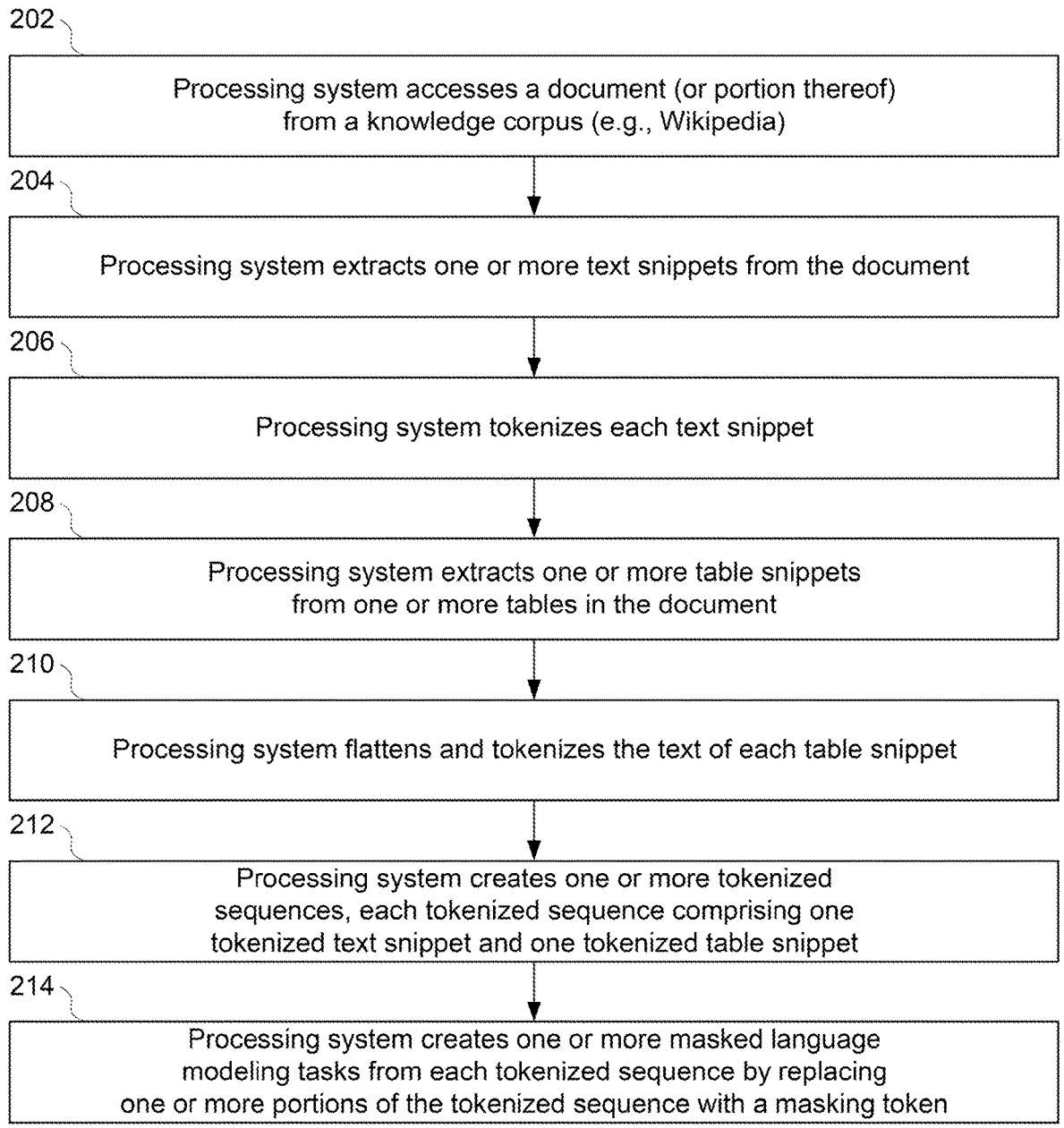
FIG. 2 is a flow diagram of an exemplary method of generating a masked-language modeling task, in accordance with aspects of the disclosure.

In that regard, FIG. 2 is a flow diagram of an exemplary process 200 that may be followed by the processing system to generate a masked language modeling task, in accordance with aspects of the disclosure. Thus, in step 202, the processing system accesses a document from a knowledge corpus. As noted above, the knowledge corpus may be resident on a remote processing system (e.g., websites 110 or 118, a networked storage device, etc.), or may be stored locally. As used herein, the term "document" may refer to a whole document or some portion thereof. For example, the knowledge corpus may be an online encyclopedia such as Wikipedia, and the retrieved document may be a complete HTML page for a given entry, or a selected section or sections of the page containing one or more tables and text. In some aspects of the technology, the processing system may be configured to select a document with a table having a number of cells below a predetermined threshold (e.g., 10 cells, 100 cells, 500 cells, 1000 cells, etc.). In some aspects, the processing system may be configured to select only documents with tables that have a header (e.g., as identified by a header tag such as "<th>").

In step 204, the processing system extracts one or more snippets of text from the document. Text snippets may be any suitable length (e.g., 4, 8, 16, 32, 64, 128 wordpieces), and may be extracted from any suitable portion of the document that may contain information related to the one or more tables contained in the document. For example, in some aspects of the technology, the processing system may be configured to extract snippets from the document title (e.g., Wikipedia article title), the first sentence or paragraph of text of the document, the document description (e.g., Wikipedia's "short description," which appears at the top of each page under the title), the table captions for any tables in the document, the title of any chapter or segment in which a table is located in the document, and/or the text of any such chapter or segment, etc. The processing system may also be configured to extract snippets from any portion of the document that links to a given table.

In step 206, the processing system tokenizes each text snippet. The processing system may tokenize the text snippet in any suitable way. In some aspects of the technology, the processing system is configured to break each word of the text snippet down into a series of one or more wordpieces (e.g., the word "unknowable" may be broken down into wordpieces "un," "##know," and "##able," with "##" being a suffix indicator). The resulting tokenized text snippet will thus consist of a series of tokens, each token representing an individual wordpiece of the text snippet. In addition, the tokenized text snippet may include tokens other than wordpiece tokens. For example, the tokenized text snippet may include tokens to indicate the beginning and end of the text snippet. In some aspects of the technology, a separator token may be inserted between the tokens corresponding to each word (e.g., the text snippet "it is unknowable" may result in a tokenized text snippet of "[CLS] it [SEP] is [SEP] un ##know ##able [SEP]" where "[CLS]" is a token indicating the beginning of the snippet). In the example of FIG. 2, this tokenizing step is performed after text snippet is extracted from the document. However, in some aspects of the technology, tokenizing may instead be performed after the processing system combines the text snippet into a pre-training example.

In step 208, the processing system extracts one or more table snippets from one or more tables in the document. For example, in some aspects of the technology, the processing system may extract only selected columns and/or rows of the table. In some aspects, the processing system may be configured to limit the size of each table snippet to a predetermined number of wordpieces, and thus may limit the number of cells harvested, and/or the number of words harvested from each selected column name, row name, and/or cell in order to create a snippet that does not exceed that predetermined size. In addition, in some aspects of the technology, a table snippet may comprise an entire table.

In step 210, the processing system flattens and tokenizes the text of each table snippet, resulting in a tokenized table snippet comprised of a series of tokens. The text of each cell of the table snippet may be tokenized in any suitable way. For example, the text of each cell may be subjected to wordpiece tokenization in the same manner described above with respect to step 206. In the example of FIG. 2, the tokens corresponding to each cell and column are not separated from one another. Rather, the language model is configured to add various embeddings when initially processing the resulting masked-language modeling task as shown in FIG. 3B including table-aware positional embeddings that assign a row and column ID to each token. However, in some aspects of the technology, the processing system may also be configured to insert separator tokens (e.g., "[SEP]," "[COL]," "[ROW]," etc.) when tokenizing the table snippet so that the tokens corresponding to each cell and column are logically separated from those of adjacent cells and columns. Here as well, in the example of FIG. 2, the table snippet is tokenized after it is extracted from the document. However, in some aspects of the technology, the table snippet may instead be tokenized after the processing system combines the text snippet into a tokenized sequence.

In step 212, the processing system creates one or more tokenized sequences using the one or more tokenized text snippets and the one or more tokenized table snippets. In the example of FIG. 2, each tokenized sequence comprises one tokenized text snippet concatenate with one tokenized table snippet separated by a separator token. However, tokenized sequences may comprise any combination of one or more tokenized text snippets and one or more tokenized table snippets. Thus, for example, in some aspects of the technology, tokenized sequences may comprise two or more tokenized text snippets and one tokenized table snippet, or one tokenized text snippet and two or more tokenized table snippets, or two or more tokenized text snippets and two or more tokenized table snippets.

In step 214, the processing system creates one or more masked language modeling tasks from each tokenized sequence by replacing one or more portions of the sequence with a masking token (e.g., "[MASK]"). Any suitable portion of each sequence may be masked. In some aspects of the technology, the processing system may be configured to only mask whole words from each text snippet. In some aspects of the technology, the processing system may be configured to mask entire cells of any table snippet, such that all tokens from a given cell of the table snippet will be replaced with a single masking token.

In some aspects of the technology, the processing system may generate the masked language modeling tasks by simply masking words and cells at random. In some aspects of the technology, the processing system may utilize natural language processing to identify specific words or types of words deemed more salient such as names of people, countries, dates, etc. In addition, although FIG. 2 sets forth an exemplary process by which the knowledge retriever may generate masked language modeling tasks, in some aspects of the technology, a prearranged masked modeling task may instead be provided to the language model.

Once the processing system provides a masked language modeling task to the language model, the language model will initially process the masked language modeling task with embedding functions in order to create a transformed version of the masked language modeling task that includes a vector for each token. In that regard, FIG. 3A shows an exemplary text snippet 302 and table snippet 304, in accordance with aspects of the disclosure. For illustrative purposes, the word "dog" in text snippet 302 and "breed" in table snippet 304 are shown in bolded text to indicate that they will be the words masked in the associated masked language modeling task 306. Although FIGS. 3A and 3B depict an example in which tokens are masked from both the text snippet 302 and the table snippet 304, this is merely for illustrative purposes. A given masked-language modeling task may also involve masking of only one or more tokens of the text snippet, or masking of only one or more tokens of the table snippet.

FIG. 3B shows the associated masked language modeling task 306, as well as an exemplary transformed version thereof which is comprised of set of embeddings 308-318. The vector for a given token will comprise a set of values assigned for a given token by each of the embedding functions. Thus, in the example of FIG. 3B, the vector for the token corresponding to the word "list" will be $\{T_{list}, 1, 0, 0, 0, 0\}$. Although the example of FIG. 3B shows six different types of embeddings 308-318, any suitable number and type of embeddings may be used. Likewise, although the example of FIG. 3B shows the embedding functions assigning a single value to each token, in practice, one or more of the embedding functions may be configured to assign vectors rather than single values. In such a case, the final vector for a given token may be created by combining (e.g., adding, concatenating, etc.) each of the individual vectors and/or values assigned by each embedding function for that given token.

The token embeddings 308 for each token are represented symbolically as $T_{[CLS]}$, $T_{list}$, etc. However, in practice, the token embedding function may instead assign a specific value or vector to each token. For example, the token embedding function may be configured to assign a value of 1 to the "[CLS]" prefix token ($T_{[CLS]}$), and a value of 0.223 to the token for the word "list" ($T_{list}$). Likewise, in some aspects of the technology, the token embedding function may be configured to instead assign a unique vector to each different token, such that one or more values in the vector corresponding to the "[CLS]" prefix token ($T_{[CLS]}$) differ from those in the vector corresponding to the token for the word "list" ($T_{list}$). Such vectors may be any suitable length (e.g., 32, 64, 128, 1024 elements). The token embedding function may operate based on a preset algorithm or may be a learned embedding function which may assign different values to a given token at different times based on how its parameters change during training.

The position embedding function assigns position embeddings 310 based on where each token is found sequentially in the input sequence (or some portion thereof), which in this case is the masked-language modeling task 306. Thus, in the example of FIG. 3B, the prefix token "[CLS]" receives a value of 0, and each next token in the masked-language modeling task 306 receives the next value, culminating in the last token (the token for the wordpiece "##triever") receiving a value of 24. Although in this example, the initial value is 0 and each next value is an integer, any suitable paradigm may be used. For example, the position embedding function may be configured to only assign values between 0 and 1, and thus may assign values of 0, 0.001, 0.002, . . . 0.024 to the twenty-five tokens of the masked-language modeling task 306. Moreover, although the example of FIG. 3B shows what would result from a position embedding function that sequentially numbers every token in the input sequence, in some aspects of the technology, the position embedding function may be configured to reset the count at one or more points in the input sequence. For example, in some aspects of the technology, the position embedding function may be configured to reset the count at the beginning of the table snippet 304, the beginning of each new row of the table snippet 304, and/or the beginning of each new cell of the table snippet 304.

The segment embedding function assigns segment embeddings 312 based on whether the token belongs to the text snippet 302 or the table snippet 304. In this example, the segment embedding function is configured to assign a value of 0 to the tokens of the text snippet 302 as well as the prefix and separator tokens ("[CLS]" and "[SEP]"), and a value of 1 to the tokens of the table snippet 304. However, any other suitable paradigm may be used for assigning distinct values to these two categories of tokens. In addition, in other contexts, such as when the language model processes a question-table pair during fine-tuning, the question may be separated from the flattened table with the "[SEP]" token. In such a case, the tokens of the question may thus receive values of 0 from the segment embedding function, while the tokens of the table receive values of 1.

The column embedding function assigns column embeddings 314 based on whether the token belongs to the text snippet 302, or a given column of the table snippet 304. In this example, the column embedding function is configured to assign a value of 0 to the tokens of the text snippet 302 as well as the prefix and separator tokens ("[CLS]" and "[SEP]"), a value of 1 to the tokens of the first column in the table snippet 304, a value of 2 to the tokens of the second column in the table snippet 304, and so on. Thus, the token corresponding to the word "rank," which is found in the first column of table snippet 304, is assigned a value of 1, while the "[MASK]" token corresponding to the masked word "breed" found in the second column of table snippet 304 is assigned a value of 2. However, any other suitable paradigm may be used for assigning distinct values to each of these categories of tokens. For example, the column embedding function may be configured to only assign values between 0 and 1, and thus may assign values of 0 to the tokens of the text snippet 302 and the prefix and separator tokens, and values of 0.001, 0.002, etc. to the tokens of the table snippet 304 according to what column they belong to. Likewise, in other contexts, such as when the language model processes a question-table pair during fine-tuning, the tokens of the question may receive values of 0 from the column embedding function, while the tokens of the table receive non-zero values according to their respective columns.

The row embedding function assigns row embeddings 316 based on whether the token belongs to the text snippet 302, or a given row of the table snippet 304. In this example, the row embedding function is configured to assign a value of 0 to the tokens of the text snippet 302 as well as the prefix and separator tokens ("[CLS]" and "[SEP]"), a value of 1 to the tokens of the first row in the table snippet 304, a value of 2 to the tokens of the second row in the table snippet 304, and so on. Thus, the token corresponding to the word "rank" and the "[MASK]" token corresponding to the masked word "breed" are each assigned a value of 1 because they come from the first row of the table snippet 304, while the tokens corresponding to the wordpieces "1," "lab," "##rador," "re," and "##triever" are each assigned a value of 2 because they come from the second row of the table snippet 304. However, any other suitable paradigm may be used for assigning distinct values to each of these categories of tokens. For example, the row embedding function may be configured to only assign values between 0 and 1, and thus may assign values of 0 to the tokens of the text snippet 302 and the prefix and separator tokens, and values of 0.001, 0.002, etc. to the tokens of the table snippet 304 according to what row they belong to. Likewise, in other contexts, such as when the language model processes a question-table pair during fine-tuning, the tokens of the question may receive values of 0 from the row embedding function, while the tokens of the table receive non-zero values according to their respective row. Further, in some aspects of the technology, the row embedding function may be configured to assign values of 0 to one or more header rows of the table snippet 304, and non-zero values to the remaining rows of the table snippet 304.

The rank embedding function assigns rank embeddings 318 based on whether values in any given column can be parsed as floating numbers, and how those values rank relative to other numbers in that column. Thus, the rank embedding function is configured to assign a value of 0 to the tokens of the text snippet 304, the prefix and separator tokens ("[CLS]" and "[SEP]"), and any tokens of the table snippet corresponding to a cell that cannot be parsed as a floating number. As such, in this example, all tokens of the masked-language modeling task 306 will receive a value of 0 except for the numbers found in column 1, rows 2-4 of the table snippet 304. As to the tokens corresponding to column 1, rows 2-4 of the table snippet 304, the rank embedding function will sort those tokens and assign a value according to their rank relative to each other. In this case, as the tokens are already in sequential order, the rank embeddings will end up being the same as the tokens themselves. However, if the table snippet 304 were to have a third column listing average weights in pounds as shown in FIG. 5A, then a similarly configured rank embedding function would assign a rank of 2 to row 1 (having the second highest value of 80), a rank of 3 to row 2 (having the highest value of 85), and a rank of 1 to row 3 (having the lowest value of 75). Here again, any other suitable paradigm may be used for assigning values to these tokens. For example, the rank embedding function may be configured to only assign values between 0 and 1, and thus may assign values of 0 to the tokens of the text snippet 302 and the prefix and separator tokens, and values of 0.001, 0.002, etc. to any tokens of any floating point numbers in a given column of the table snippet 304 corresponding to their relative ranks. Likewise, in other contexts, such as when the language model processes a question-table pair during fine-tuning, the tokens of the question may receive values of 0 from the rank embedding function, while any tokens corresponding to floating point numbers of the table receive non-zero values according to their ranks within their respective columns. Further, although the examples just described assumed that the rank embedding function would sort the numbers from lowest to highest and assign the lowest rank to the lowest number of the column, the rank embedding function may also be configured to sort the numbers from highest to lowest and assign the lowest rank to the highest number in the column.

In addition to the above, the rank embedding function may be further configured to recognize and separate data in a cell that can be parsed as a floating number from other data that cannot. For example, the rank embedding function may be configured to recognize that "10 kg" represents 10 kilograms, and thus separate "10" from "kg" so that the value 10 may be sorted relative to other floating point numbers in its column. Likewise, in some aspects of the technology, the rank embedding function may be further configured to recognize data that can be represented as a floating point number and rank it based on its floating point number. Thus, the rank embedding function may be configured to recognize that dates of May, 2020, June, 2020, and July, 2020 can each be represented in a numerical form, and thus to rank them according to that numerical form.

As already noted, the embeddings shown in the example of FIG. 3B are merely illustrative, and any other suitable embeddings may be used in place of, or in addition to, those just described. In that regard, in some aspects of the technology, the language model may be configured to add embeddings to identify tokens that match one or more prior answers in order to enable the language model to understand conversational questions. For example, the language model may be configured to add a previous question or previous answer embedding that assigns a predetermined value (e.g., 1) to any tokens in a table that match the prior question or answer, and a different predetermined value (e.g., 0) to all other tokens. As discussed further below with respect to FIGS. 5A and 5B, this extra embedding may help the language model correctly discern the subject of ambiguous questions (e.g., ones in which the question uses a generic subject such as "its"), and determine what row of a table in which to look for an answer.

Once the language model has processed the masked language modeling task with embedding functions in order to create a transformed version of the masked language modeling task, the language model will then predict the original words or values that correspond to each mask token. The language model makes these predictions based on the embeddings it has applied. The processing system may then use any suitable loss function to generate loss values based on which the parameters of the language model will be tuned. For example, in some aspects of the technology, the processing system may generate a cross-entropy loss value based on the language model's predictions for each mask token and the known answers of each masked language modeling task. Furthermore, the processing system may be configured to perform back-propagation steps at any suitable interval. In that regard, in some aspects of the technology, the processing system may be configured to calculate a loss value and tune the parameters of the language model immediately after each pre-training example. In some aspects of the technology, the processing system may be configured to batch multiple pre-training examples. In such a case, the processing system may be configured to combine (e.g., sum or average) the loss values calculated during each pre-training example in the batch, apply the combined loss value during a back-propagation phase following the conclusion of the batch, and then calculate a new combined loss value during the next batch of pre-training examples.

Fine-Tuning

Figure 4:
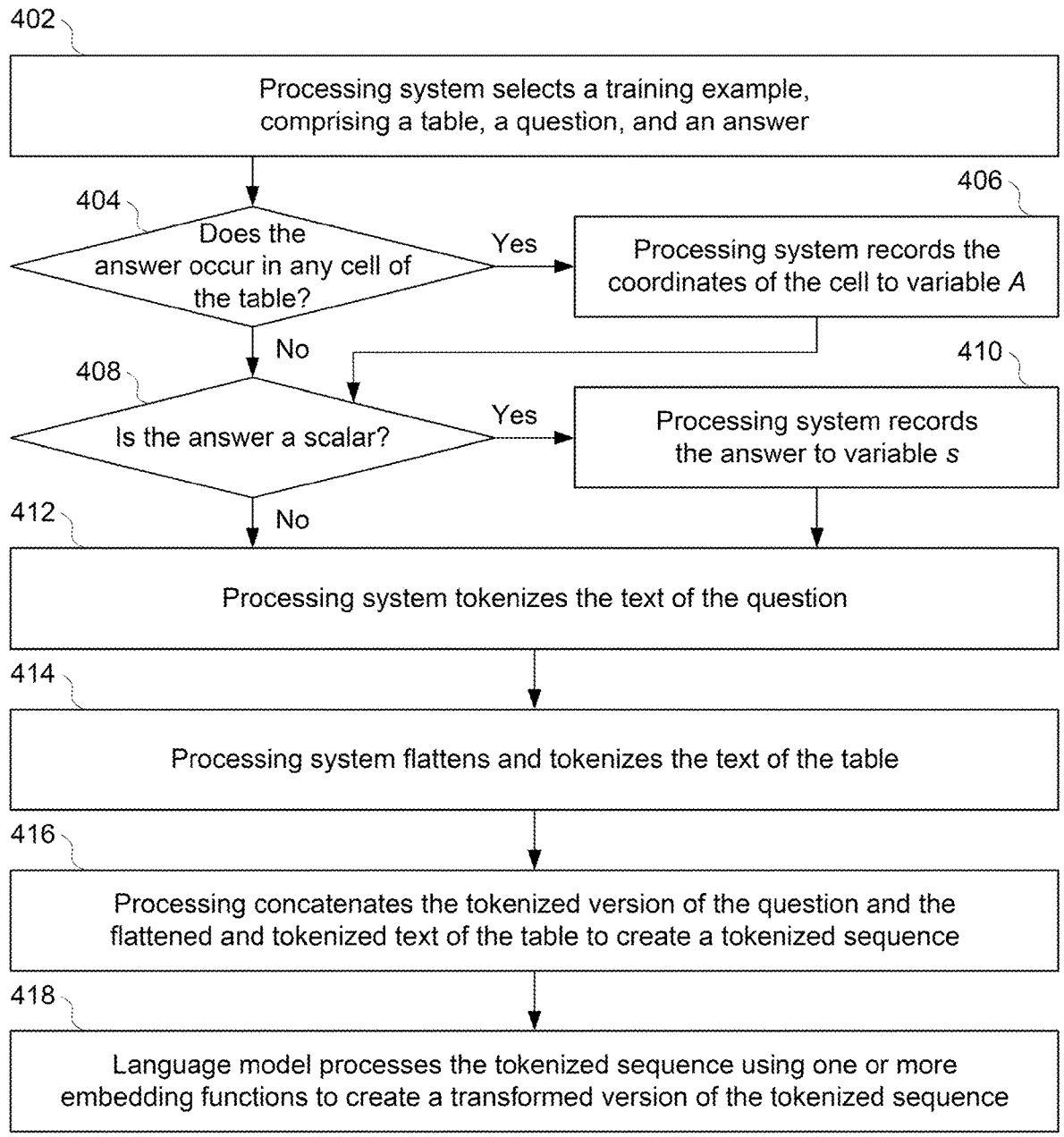
FIG. 4 is a flow diagram of an exemplary method of initially processing a fine-tuning example, in accordance with aspects of the disclosure.

FIG. 4 is a flow diagram of an exemplary process 400 that may be followed by the processing system to initially process a fine-tuning example, in accordance with aspects of the disclosure.

In step 402, the processing system selects a training example, comprising a table (e.g., table 502 of FIG. 5A), a question (e.g., a question 506 from a given row of FIG. 5B), and an answer (e.g., an answer 508 from the given row).

In step 404, the processing system determines whether the answer occurs in any cell of the table. In some aspects of the technology, the processing system may be configured to determine that this condition has been met if the answer occurs in a cell of the table along with other text (e.g., if the answer is "shepherd" and is found in a cell of the table whose full text is "German Shepherd"). In some aspects of the technology, the processing system may be configured to determine that this condition has only been met if the answer matches the full text of a given cell of the table. As shown by the no arrow pointing from step 404 to step 408, if the answer does not occur in a cell of the table, the processing system proceeds directly to step 408. However, as shown by the yes arrow pointing from step 404 to step 406, if the answer does occur in a given cell of table, the processing system records the coordinates of that given cell to a variable A, and then proceeds to step 408. The individual row and column coordinates recorded in variable A will be referred to below as $A_x$ and $A_y$, respectively.

In step 408, the processing system determines whether the answer is a scalar of some kind (e.g., an integer or floating point number). If not, as shown by the no arrow pointing from step 408 to step 412, the processing system proceeds directly to step 412. However, as shown by the yes arrow pointing from step 408 to step 410, if the answer is a scalar, the processing system records the answer to a variable s, and then proceeds to step 412.

Although not addressed in the flow of FIG. 4, the processing system may be further configured to discard any training example for which the answer is both not a scalar, and does not occur any cell of the table.

Training examples for which only variable A is populated will be discussed below as "cell selection" examples. As will be discussed further below, training examples 1 and 5a of FIG. 5B represent cell selection examples. Training examples for which only variable s is populated will be discussed below as "scalar answer" examples. As will be discussed further below, training example 2 of FIG. 5B represents a scalar answer example. Training examples for which both A and s are populated will be discussed below as "ambiguous" examples. As will be discussed further below, training examples 3, 4, and 5b of FIG. 5B represent ambiguous examples.

In step 412, the processing system tokenizes the text of the question. This tokenizing may take place in the same manner described above with respect to step 206 of FIG. 2.

In step 414, the processing system flattens and tokenizes the text of the table. This flattening and tokenizing may take place in the same manner described above with respect to step 210 of FIG. 2.

In step 416, the processing system creates a tokenized sequence by concatenating the tokenized version of the question created in step 404 with the flattened and tokenized version of the table created in step 406. This may be done in any suitable way, as described above with respect to step 212 of FIG. 2, and may include a separator token between the tokenized version of the question and the flattened and tokenized version of the table.

In step 418, the tokenized sequence is processed by the language model using one or more embedding functions to create a transformed version of the tokenized sequence. In that regard, the language model may process the tokenized sequence using the same embedding functions shown and described above with respect to FIG. 3B. In addition, as discussed further below with respect to training examples 5a and 5b of FIG. 5B, the language model may also process the tokenized sequence using a previous question or previous answer embedding function.

FIGS. 5A and 5B show an exemplary table 502 and set of exemplary question-answer pairs for use in fine-tuning the language model, in accordance with aspects of the disclosure. In that regard, FIG. 5B presents a set of numbered examples 504 consisting of questions 506, answers 508, and an explanation of the type of training example 510 they represent. Although FIG. 5B presents this information in table form for illustrative purposes, a single training example would comprise a question 506 and answer 508 from a given row along with table 502, as set forth above with respect to FIG. 4.

Table 502 has three columns and four rows. The first row includes column labels of "Rank," "Breed," and "Average Weight (lbs)." In that regard, and as noted above, table 502 includes the same information in its first two columns as the exemplary table 304 of FIG. 3A, but includes an additional third column listing the average weight in pounds of each of the dog breeds listed in column 2. The numbered examples 504 of FIG. 5B can each be answered based on table 502, as described below.

Example 1 lists a question of "Which of the top three dog breeds is the heaviest on average?" and an answer of "German Shepherd." As shown in column 510 of FIG. 5B, this is a "cell selection" fine-tuning example because the answer can be found in a single cell of table 502, and the answer is not a scalar. The processing system will thus calculate loss values according to method 600 of FIG. 6.

Example 2 lists a question of "What is the average weight in pounds of the top two most popular dog breeds?" and an answer of "82.5." As shown in column 510, this is a "scalar answer" fine-tuning example because the answer is a scalar and cannot be found in a single cell of table 502. The processing system will thus calculate loss values according to method 700 of FIG. 7. It should be noted that the answer listed in column 508 includes a parenthetical showing that the answer of 82.5 is derived from using the AVERAGE aggregation operation on the values in column 3, rows 2 (80) and column 3, row 3 (85) of table 502. This parenthetical is included in FIG. 5B only for explanatory purposes, and would not be provided to the language model.

Example 3 lists a question of "How many of the top three dog breeds are a type of retriever?" and answer of "2." As shown in column 510, this is an "ambiguous" fine-tuning example because the answer is both a scalar and can be found in a single cell of table 502 (at column 1, row 3). As such, the processing system will first run through the method 900 of FIG. 9 in order to determine whether to calculate loss values according to method 600 of FIG. 6 or method 700 of FIG. 7. As shown in column 510, if the language model is able to correctly predict the type of training example this is, it will calculate loss values for example 3 according to method 700 of FIG. 7. In that regard, as indicated in the explanatory parenthetical in column 508 (which would not be provided to the language model), the answer of 2 can be derived from using the COUNT aggregation operation to count how many cells in column 2 include the word "retriever." In this case, because the values of column 2, row 2 ("Labrador Retriever") and column 2, row 4 ("Golden Retriever") both include "retriever," the COUNT aggregation operation returns a value of "2."

Example 4 lists a question of "What is the popularity rank of the German Shepherd?" and answer of "2." As was the case with the identical answer in Example 3, this is another "ambiguous" fine-tuning example because the answer is both a scalar and can be found in a single cell of table 502. Here again, the processing system will first run through the method 900 of FIG. 9 in order to determine whether to calculate loss values according to method 600 of FIG. 6 or method 700 of FIG. 7. If the language model is able to correctly predict the type of training example this is, it will calculate loss values for example 4 according to method 600 of FIG. 6. In that regard, the question of example 4 can be answered by looking for the value in the "Rank" column that applies to the "German Shepherd" (i.e., 2).

Example 5 lists a pair of conversational questions, both of which would be paired with the same table 502. In that regard, example 5-1 lists a first question of "What is the most popular dog breed?" and an answer of "Labrador Retriever." As shown in column 510 of FIG. 5B, this is a "cell selection" fine-tuning example because the answer can be found in a single cell of table 502, and the answer is not a scalar. The processing system will thus calculate loss values according to method 600 of FIG. 6. Example 5-2 then lists a second question of "What is its average weight in pounds?" and an answer of "80." Because 80 is both a scalar and a value that can be found in a single cell of table 502 (column 3, row 2), this is an ambiguous answer. The processing system will thus first run through the method 900 of FIG. 9 in order to determine whether to calculate loss values according to method 600 of FIG. 6 or method 700 of FIG. 7. If the language model is able to correctly predict the type of training example this is, it will calculate loss values for example 5-1 according to method 600 of FIG. 6. In that regard, the question of example 5-2 can be answered by looking for the value in the "Average Weight (lbs)" column that applies to the "Labrador Retriever" (i.e., 80).

As alluded to above, examples 5-1 and 5-2 present one possible situation in which conversational embeddings such as a previous question or previous answer embedding may be helpful to the language model. In that regard, as a single question, example 5-2 would be unanswerable, as it cannot be known what the generic subject "its" refers to. However, if the answer to the prior question is known, it becomes possible to infer that "its" refers back to the answer of the prior question ("Labrador Retriever") and thus that the answer to the question of example 5-2 should be found in the row which includes "Labrador Retriever" (row 2 of table 502). In order to enable the language model to infer links between successive questions, the language model can be configured to add a previous answer embedding when it transforms the flattened and tokenized version of table 502 (as discussed above with respect to FIG. 3B). In that regard, in some aspects of the technology, a previous answer embedding function may be configured to assign a predetermined value (e.g., 1) to any tokens in the table that match the previous answer, and a different predetermined value (e.g., 0) to all other tokens. Likewise, in some aspects of the technology, the previous question embedding function may be configured to assign a predetermined value (e.g., 1) to all tokens in the same row (or the same column, or both) as the previous answer, and a different predetermined value (e.g., 0) to all other tokens. Based on such an embedding, the language model may be able to learn that generic subjects such as "its" often refer back to the subject of a prior answer, and thus that the correct answer is most likely to reside in the same row as that answer. Moreover, although examples 5-1 and 5-2 both utilize the same reference table 502, a previous answer or previous question embedding can likewise be advantageous even when the first question uses a different table than the second question.

FIG. 6 is a flow diagram of an exemplary process 600 that may be followed by the processing system during fine-tuning to process a cell selection example in which the answer occurs in a cell of the table and is not a scalar (and thus variable A is nonzero, and variable s is null), in accordance with aspects of the disclosure.

In step 602, the language model generates a probability $p_{col}(co)$ for each given column co in the table, and selects the column Y with the greatest probability value. Probability $p_{col}(co)$ represents the language model's learned prediction of whether the given column co contains the answer to the question set forth in the fine-tuning example. The language model makes its $p_{col}(co)$ predictions based on the question and the table provided in the fine-tuning example.

In step 604, the language model generates a probability value $p_{cell}(c)$ for every cell c in column Y. Probability $p_{cell}(c)$ represents the language model's learned prediction of whether the answer to the question set forth in the fine-tuning example will be based on the value of cell c. The language model also makes its $p_{cell}(c)$ predictions based on the question and the table provided in the fine-tuning example.

In step 606, the language model generates a probability value $p_a(op_i)$ for every aggregation option in a preselected set of aggregation options. Probability $p_a(op_i)$ represents the language model's learned prediction of whether the answer to the question can be derived from a single cell of the table, or whether the answer will require aggregating values from two or more cells of the table using a particular aggregation operation. The language model also makes its $p_a(op_i)$ predictions based on the question and the table provided in the fine-tuning example.

In the context of FIG. 6 and the further examples below, it will be assumed that the language model is configured to consider four different possible aggregation options: (1) $op_0$ refers to no aggregation, indicating that the model predicts that the answer will be found in a single cell of the table; (2) $op_1$ refers to a "count" operation in which the model will need to count some number of cells in the table to determine the answer; (3) $op_2$ refers to a "sum" operation in which the model will need to sum the values of two or more cells in the table to determine the answer; and (4) ops refers to an "average" operation in which the model will need to average the values of two or more cells in the table to determine the answer. However, this set of exemplary aggregation options is merely illustrative, and the language model may be configured to consider any other suitable aggregation operations in place of or in addition to those mentioned herein.

In step 608, the processing system generates a first loss value $J_{column}$ based on the $p_{col}(co)$ values for each column co, and the column identifier $A_y$ of the answer (stored in variable A, as discussed above with respect to step 406 of FIG. 4). This first loss value $J_{column}$ may be generated according to any suitable loss equation that tends to train the model to predict higher values for $p_{col}(A_y)$. In that regard, the first loss value $J_{column}$ may be generated according to an equation that tends to generate a relatively small loss when the predicted value of $p_{col}(A_y)$ is relatively large, and which tends to generate a relatively large loss when the predicted value of $p_{col}(A_y)$ is relatively small. For example, in some aspects of the technology, this first loss value $J_{column}$ may be an average binary cross-entropy loss over all columns, and may be calculated according to Equations 1-3, below. In Equations 1-3, the term "Cols" represents the set of all columns in the table, and "|Cols|" represents the number of total columns in the table.

$$J_{columns} = \frac{1}{|Cols|} \sum_{co \in Cols} CE\left(p_{col}(co), \mathbb{1}_{co=A_y}\right) \tag{1}$$

$$CE\left(p_{col}(co), \mathbb{1}_{co=A_y}\right) = \tag{2}$$
$$-\log(p_{col}(co)) \cdot \mathbb{1}_{co=A_y} + \log(1 - p_{col}(co)) \cdot \left(1 - \mathbb{1}_{co=A_y}\right)$$

$$\mathbb{1}_{co=A_y} = \begin{cases} 1, co = A_y \\ 0, co \neq A_y \end{cases} \tag{3}$$

In step 610, the processing system generates a second loss value $J_{cells}$ based on the $p_{cell}(c)$ values for each cell c in column Y, and the table coordinates A of the answer (as discussed above with respect to step 406 of FIG. 4). This second loss value $J_{cells}$ may be generated according to any suitable loss equation that tends to train the model to predict higher values for $p_{cell}(A)$. In that regard, the second loss value $J_{cells}$ may be generated according to an equation that tends to generate a relatively small loss when the predicted value of $p_{cell}(A)$ is relatively large, and which tends to generate a relatively large loss when the predicted value of $p_{cell}(A)$ is relatively small. For example, in some aspects of the technology, this second loss value $J_{cell}$ may be an average binary cross-entropy loss calculated over all cells in column Y, and may be calculated according to Equations 4-6, below. In Equations 4-6, the term "Cells(Y)" represents the set of all cells in the column Y, and "|Cells(Y)|" represents the number of total cells in column Y.

$$J_{cells} = \frac{1}{|Cells(Y)|} \sum_{c \in Cells(Y)} CE\left(p_{cell}(c), \mathbb{1}_{c=A}\right) \tag{4}$$

$$CE\left(p_{cell}(c), \mathbb{1}_{c=A}\right) = -\log(p_{cell}(c)) \cdot \mathbb{1}_{c=A} + \log(1 - p_{cell}(c)) \cdot \left(1 - \mathbb{1}_{c=A}\right) \tag{5}$$

-continued $$\mathbb{1}_{c=A} = \begin{cases} 1, c = A \\ 0, c \neq A \end{cases} \tag{6}$$

In step 612, the processing system generates a third loss value $J_{aggr}$ based on the $p_a(op_0)$ value representing the model's prediction of whether the "no aggregation" option should be used to answer the fine-tuning example. Because it is known that this is a cell selection example (by virtue of variable A being nonzero, and variable s being null), and thus that the "no aggregation" option should be selected, this third loss value $J_{aggr}$ may be generated according to any suitable loss equation that tends to train the model to predict higher values for $p_a(op_0)$. In that regard, the third loss value $J_{aggr}$ may be generated according to an equation that tends to generate a relatively small loss when the predicted value of $p_a(op_0)$ is relatively large, and which tends to generate a relatively large loss when the predicted value of $p_a(op_0)$ is relatively small. For example, in some aspects of the technology, this third loss value $J_{aggr}$ may be calculated according to Equation 7, below.

$$J_{aggr} = -\log p_a(op_0) \tag{7}$$

In step 614, the processing system generates a total loss value $J_{CS}$ based on the first, second, and third loss values. This total loss value $J_{CS}$ may be generated according to any suitable equation. In that regard, in some aspects of the technology, the total loss value $J_{CS}$ may be a summation or average of the first, second, and third loss values. Likewise, in some aspects of the technology, one or more of the first, second, and third loss values may be multiplied by a scaling hyperparameter, and then summed or averaged to arrive at the total loss value $J_{CS}$. For example, in some aspects of the technology, the total loss value $J_{CS}$ may be calculated according to Equation 8, below, in which the term "a" is a scaling hyperparameter.

$$J_{CS} = J_{columns} + J_{cells} + \alpha \cdot J_{aggr} \tag{8}$$

The value of α may be any suitable value, and may be set according to any suitable criteria. For example, multiple language models may be trained using different values for α, and tested against one or more benchmark data sets in order to choose a value for a that achieves the best results.

In step 616, the processing system modifies one or more parameters of the language model based on the total loss value $J_{CS}$. This may be done at any suitable interval. In that regard, in some aspects of the technology, the processing system may be configured to use each total loss value immediately after each fine-tuning example, applying it during back-propagation to tune the parameters of the language model, and then calculating a new total loss value during the next fine-tuning example. In some aspects of the technology, the processing system may be configured to batch multiple fine-tuning examples. In such a case, the processing system may be configured to combine (e.g., sum or average) the total loss values calculated during each fine-tuning example in the batch, apply the combined total loss value during a back-propagation phase following the conclusion of the batch, and then calculate a new combined total loss value during the next batch of fine-tuning examples. If the processing system is configured to batch multiple fine-tuning examples, the batch may comprise a collection of cell selection examples, scalar answer examples, and/or ambiguous examples, and the combined total loss value used during each back-propagation phase may thus include a collection of different total loss values calculated according to the methods of FIGS. 6, 7, and 9.

Although the example of FIG. 6 includes an initial column-selection step (step 602) in which the language model selects the column Y most likely to contain the answer to the question of the fine-tuning example, in some aspects of the technology, the language model may instead be configured to omit step 602. In such a case, the language model may be configured to follow method 600 as described above, but to instead begin at step 604 and generate $p_{cell}(c)$ values for every cell c in the table (rather than only those cells in column Y). In addition, the processing system may also be configured to omit the generation of the first loss value $J_{column}$ (step 608), and to calculate the second loss value $J_{cells}$ based on the $p_{cell}(c)$ values for each cell c in the table (rather than only those cells in column Y). Finally, the processing system may be configured to calculate the total loss value $J_{CS}$ based solely on the second loss value $J_{cells}$ and the third loss value $J_{aggr}$. In such a case, the second loss value $J_{cells}$ may thus be calculated according to Equations 9-11 below, and the total loss value $J_{CS}$ may be calculated according to Equation 12 below. Other than the term "Cells" (representing the set of all cells in the table) and the term "|Cells|" (representing the number of total cells in the table), all other terms of Equations 9-12 are as described above with respect to Equations 4-8 and steps 610-614.

$$J_{cells} = \frac{1}{|Cells|} \sum_{c \in Cells} CE(p_{cell}(c), \mathbb{1}_{c=A}) \qquad (9)$$

$$CE(p_{cell}(c), \mathbb{1}_{c=A}) = -\log(p_{cell}(c)) \cdot \mathbb{1}_{c=A} + \log(1 - p_{cells}(c)) \cdot (1 - \mathbb{1}_{c=A}) \qquad (10)$$

$$\mathbb{1}_{c=A} = \begin{cases} 1, c = A \\ 0, c \neq A \end{cases} \qquad (11)$$

$$J_{CS} = J_{cells} + \alpha \cdot J_{aggr} \qquad (12)$$

Figure 7:
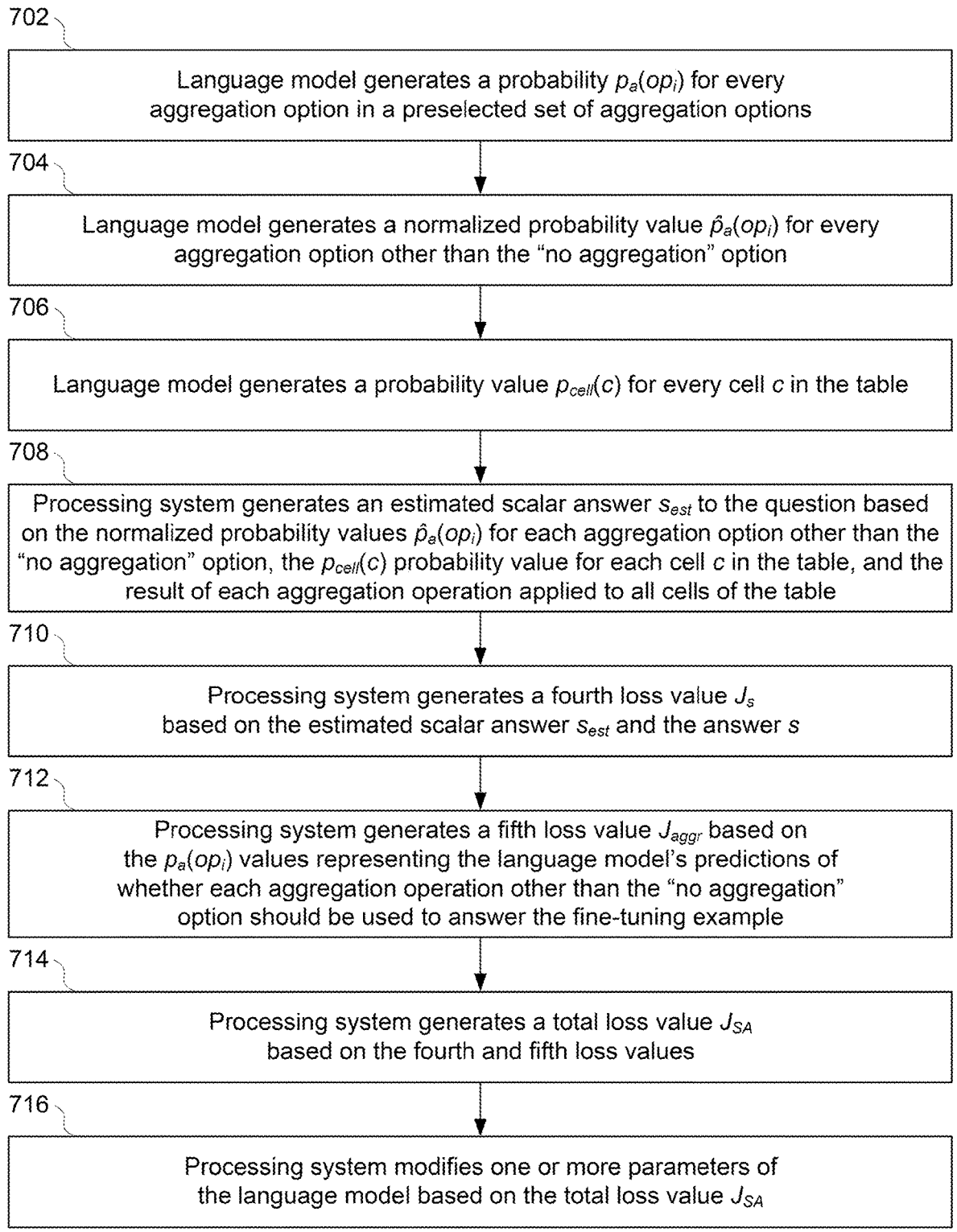
FIG. 7 is a flow diagram of an exemplary method of processing a "scalar answer" fine-tuning example, in accordance with aspects of the disclosure.

FIG. 7 is a flow diagram of an exemplary process 700 that may be followed by the processing system during fine-tuning to process a scalar answer example in which the answer is a scalar and does not occur in any cell of the table (and thus variable s is nonzero, and variable A is null), in accordance with aspects of the disclosure.

In step 702, the language model generates a probability value $p_a(op_i)$ for every aggregation option in a preselected set of aggregation options. Here again, probability $p_a(op_i)$ represents the language model's learned prediction of whether the answer to the question can be derived from a single cell of the table, or whether the answer will require aggregating values from two or more cells of the table using a particular aggregation operation. The language model makes its $p_a(op_i)$ predictions based on the question and the table provided in the fine-tuning example.

In step 704, the language model generates a normalized probability value $\hat{p}_a(op_i)$ for every aggregation option other than the "no aggregation" option. Thus, assuming that $op_0$ represents the "no aggregation" option, the normalized probability value for all aggregation operations (numbered 1 to n) can be expressed according to Equation 13, below:

$$\hat{p}_a(op_i) = \frac{p_a(op_i)}{\sum_{j=1}^{n} p_a(op_j)} \qquad (13)$$

In step 706, the language model generates a probability value $p_{cell}(c)$ for every cell c in the table. Here as well, probability $p_{cell}(c)$ represents the language model's learned prediction of whether the answer to the question set forth in the fine-tuning example will be based on the value of cell c. As mentioned above, the language model makes its $p_{cell}(c)$ predictions based on the question and the table provided in the fine-tuning example.

In step 708, the language model generates an estimated scalar answer $s_{est}$ to the question based on the normalized probability values $\hat{p}_a(op_i)$ for each aggregation option other than the "no aggregation" option, the $p_{cell}(c)$ probability value for each cell c in the table, and the result of each aggregation operation applied to all cells of the table. This estimated scalar answer $s_{est}$ may be generated according to Equation 14 below. Here again, the set of all aggregation operations other than the "no aggregation" option are numbered 1 to n. The function compute($op_i$, $p_{cells}$, T) will be explained below with respect to the example of FIGS. 8A and 8B.

$$s_{est} = \sum_{i=1}^{n} \hat{p}_a(op_i) \cdot \text{compute}(op_i, p_{cells}, T) \qquad (14)$$

In step 710, the processing system generates a fourth loss value $J_s$ based on the estimated scalar answer $s_{est}$ and the answer s (stored in variable s, as discussed above with respect to step 410 of FIG. 4). This first loss value $J_s$ may be generated according to any suitable loss equation such as a Huber loss or squared loss. For example, in some aspects of the technology, this fourth loss value $J_s$ may be a Huber loss calculated according to Equations 15 and 16, below, in which the term "β" is a scaling hyperparameter.

$$J_s = \begin{cases} 0.5 \cdot a^2 & , a \leq \beta \\ \beta \cdot a - 0.5 \cdot \beta^2 & , a > \beta \end{cases} \qquad (15)$$

$$a = |s_{est} - s| \qquad (16)$$

Here as well, the value of β may be any suitable value, and may be set according to any suitable criteria. For example, multiple language models may be trained using different values for β, and tested against one or more benchmark data sets in order to choose a value for β that achieves the best results.

In step 712, the processing system generates a fifth loss value $J_{aggr}$ based on the $p_a(op_i)$ values representing the language model's predictions of whether each aggregation operation other than the "no aggregation" option should be used to answer the fine-tuning example. Because it is known that this is a scalar answer example (by virtue of variable A being null, and variable s being nonzero), and thus that some aggregation operation should be selected, this fifth loss value $J_{aggr}$ may be generated according to any suitable loss equation that tends to train the model to predict higher $p_a(op_i)$ values for the set of available the aggregation operations other than the "no aggregation" option (referred to herein as $p_a(op_1)$ through $p_a(op_n)$). In that regard, the fifth loss value $J_{aggr}$ may be generated according to an equation that tends to generate a relatively small loss when the collective predictions for $p_a(op_1)$ through $p_a(op_n)$ is relatively large, and which tends to generate a relatively large loss when the collective predictions for $p_a(op_1)$ through $p_a(op_n)$ is relatively small. For example, in some aspects of the technology, this fifth loss value $J_{aggr}$ may be calculated according to Equation 17, below. Here again, the set of all aggregation operations other than the "no aggregation" option are numbered 1 to n.

$$J_{aggr} = -\log\left(\sum_{i=1}^{n} p_a(op_i)\right) \quad (17)$$

In step 714, the processing system generates a total loss value $J_{SA}$ based on the fourth and fifth loss values. This total loss value $J_{SA}$ may be generated according to any suitable equation. In that regard, in some aspects of the technology, the total loss value $J_{SA}$ may be a summation or average of the fourth and fifth loss values. Likewise, in some aspects of the technology, one or more of the fourth and fifth loss values may be multiplied by a scaling hyperparameter, and then summed or averaged to arrive at the total loss value $J_{SA}$. For example, in some aspects of the technology, the total loss value $J_{CS}$ may be calculated according to Equation 18, below, in which the term "δ" is a scaling hyperparameter.

$$J_{SA} = J_{aggr} + \delta \cdot J_s \quad (18)$$

The value of S may be any suitable value, and may be set according to any suitable criteria. For example, multiple language models may be trained using different values for δ, and tested against one or more benchmark data sets in order to choose a value for a that achieves the best results.

In addition, in some aspects of the technology, the processing system may be configured to weed out examples in which the fourth loss value $J_s$ is too high, as such cases may indicate that the training example required an aggregation operation that was not included in the set of available aggregation operations $op_1$ through $op_n$. In such a case, the processing system may be configured to only use Equation 18 if the value of $J_s$ is below some predetermined cutoff value, and otherwise to set the total loss value $J_{SA}$ to zero.

In step 716, the processing system modifies one or more parameters of the language model based on the total loss value $J_{SA}$. As explained above with respect to step 616 of FIG. 6, this may be done at any suitable interval. As such, the processing system may be configured to tune the parameters of the language model after every fine-tuning example is processed based on that example's total loss value, or the processing system may be configured to batch multiple fine-tuning examples together and only tune the parameters based on a combined total loss value (e.g., a sum or average of all total loss values calculated for the examples of that batch). Again, if the processing system is configured to batch multiple fine-tuning examples, the batch may comprise a collection of cell selection examples, scalar answer examples, and/or ambiguous examples, and the combined total loss value used during each back-propagation phase may thus include a collection of different total loss values calculated according to the methods of FIGS. 6, 7, and 9.

Although the example of FIG. 7 assumes that the language model will generate $p_{cell}(c)$ values for every cell c in the table, in some aspects of the technology, the language model may instead be configured to first perform a column-selection step as discussed above with respect to step 602 of FIG. 6 in order to predict the column Y most likely to contain the cells needed to answer the question of the fine-tuning example. In such a case, the language model may be configured to follow method 700 as described above, but to only generate $p_{cell}(c)$ values for every cell c in column Y at step 706 (rather than all cells c in the table). In addition, at step 708, the language model may be configured to generate the estimated scalar answer $s_{est}$ based on the normalized probability values $\hat{p}_a(op_i)$ for each aggregation option other than the "no aggregation" option, the $p_{cell}(c)$ probability value for each cell c in column Y (rather than all cells c in the table), and the result of each aggregation operation applied to all cells in column Y (rather than all cells of the table). Finally, the processing system may be configured to generate a sixth loss value $J_{column}$ as discussed above with respect to step 608 of FIG. 6, and to add that sixth loss value (potentially multiplied by a further scaling parameter) to the fourth and fifth loss values to generate the total loss value $J_{SA}$.

FIGS. 8A and 8B show an exemplary table, and the probability values and computations used to generate a predicted scalar answer, in accordance with aspects of the disclosure. In that regard, FIG. 8A shows an exemplary table 802 that has identical data to table 502 of FIG. 5A, but which further includes an additional bracketed number in each cell indicating the cell's $p_{cell}$ value. The bracketed numbers in each cell are for illustrative purposes only, and would not be in the table presented to the language model. Table 802 is also referred to below as table T in the context of discussing the compute($op_i$, $p_{cells}$, T) values.

In this example, it is assumed that the language model has been asked to answer the question of example 2 of FIG. 5B: "What is the average weight in pounds of the top two most popular dog breeds?" It is further assumed that the language model has predicted from the text of the question and table 802 that the cells of the first and second column should each receive a $p_{cell}$ value of 0 (indicating that the language model predicts that the answer to the question will not be based on the values in these cells). Finally, with respect to the third column of table 802, it has been assumed that the language model has predicted that the first row should receive a $p_{cell}$ value of 0, that the second row should receive a $p_{cell}$ value of 0.9, that the third row should receive a $p_{cell}$ value of 0.2, and that the fourth row should receive a $p_{cell}$ value of 0.9.

FIG. 8B shows how the values in table 802 are used to calculate each aggregation operation's compute($op_i$, $p_{cells}$, T) value, and how those values and the normalized probability values $\hat{p}_a(op)$ are used to calculate the estimated scalar answer $s_{est}$.

In that regard, column 804 lists the three aggregation operations of this example. The "count" operation simply assigns a value of 1 to every cell in the table. The "sum" operation adds the values of every cell of the table. The "average" operation divides the result of the "sum" operation by the result of the "count" operation.

Column 806 lists the normalized probability values $\hat{p}_a(op)$ for each of the three aggregation operations listed in column 804. As discussed above, as this fine-tuning example is "scalar answer" example, the normalized probability values $\hat{p}_a(op)$ are calculated as to all aggregation options except for the "no aggregation" option.

Column 808 shows how each compute($op_i$, $p_{cells}$, T) value is calculated based on table 802. In that regard, with respect to the COUNT operation, the language model allocates each cell a value of 1 (indicating it has been counted), multiplies it by the cell's $p_{cell}$ value, and sums these products for every cell in table T (table 802). As only three cells of table T have a nonzero $p_{cell}$ value, this results in the compute(COUNT, $p_{cells}$, T) adding (1×0.9)+(1×0.9)+(1×0.2) to arrive at a value of 2.

With respect to the SUM operation, the language model multiplies the value of each cell by its $p_{cell}$ value, and sums these products for every cell in table T. Here again, as only three cells of table T have a nonzero $p_{cell}$ value, this results in the compute(SUM, $p_{cells}$, T) adding (80×0.9)+(85×0.9)+(75×0.2) to arrive at a value of 163.5.

With respect to the AVERAGE operation, the language model calculates the SUM and COUNT values across table T, and divides the resulting SUM by the resulting COUNT. Thus, this results in the compute(AVERAGE, $p_{cells}$, T) dividing (163.5/2) to arrive at a value of 81.75.

Column 810 shows the result of multiplying the normalized probability value $\hat{p}_a(op)$ for each aggregation operation by its compute(op, $p_{cells}$, T) value. As shown, this results in values of 0.2, 16.35, and 65.4 for the COUNT, SUM, and AVERAGE operations, respectively. Finally, as shown in the last line of column 810, the estimated scalar answer $s_{est}$ is calculated by summing these values, to arrive at a final estimated scalar answer of 81.95. As discussed further above with respect to step 710 of FIG. 7, the processing system may use this $s_{est}$ value and the actual answer of 82.5 (which would have been provided to the processing system with the fine-tuning example as shown in column 508 of FIG. 5B) to calculate an a value according to Equation 16 and a loss value $J_s$ according to Equation 15.

Figure 9:
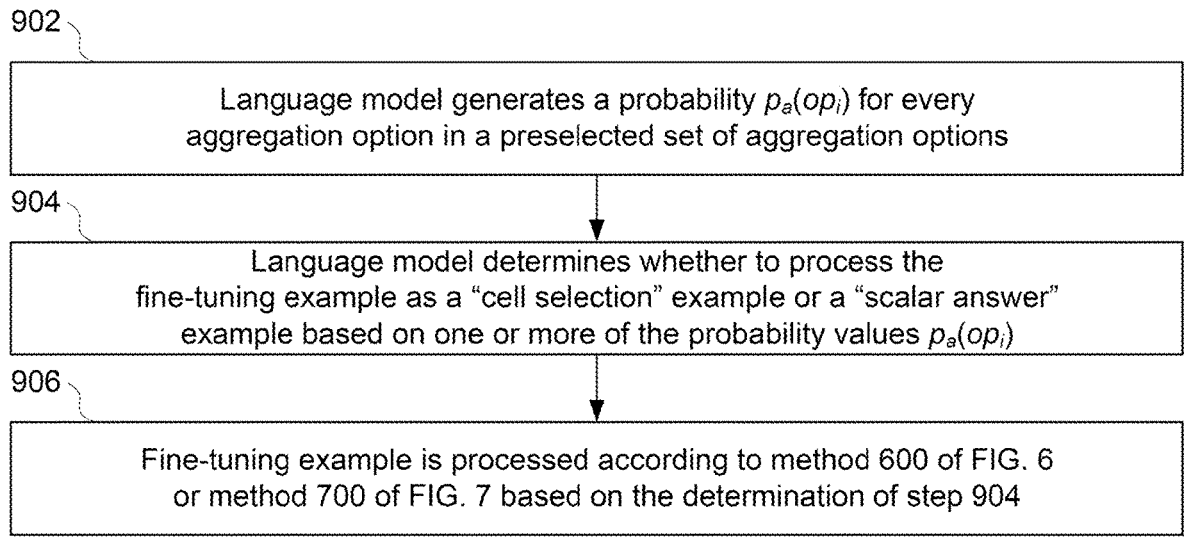
FIG. 9 is a flow diagram of an exemplary method of processing an ambiguous fine-tuning example, in accordance with aspects of the disclosure.

FIG. 9 is a flow diagram of an exemplary process 900 that may be followed by the processing system during fine-tuning to process an ambiguous example in which the answer is both a scalar and occurs in a cell of the table (and thus variables A and s are both nonzero), in accordance with aspects of the disclosure.

In step 902, the language model generates a probability value $p_a(op_i)$ for every aggregation option in a preselected set of aggregation options. Here again, probability $p_a(op_i)$ represents the language model's learned prediction of whether the answer to the question can be derived from a single cell of the table, or whether the answer will require aggregating values from two or more cells of the table using a particular aggregation operation. The language model makes its $p_a(op_i)$ predictions based on the question and the table provided in the fine-tuning example.

In step 904, the language model determines whether to process the fine-tuning example as a "cell selection" example or a "scalar answer" example based on one or more of the probability values $p_a(op_i)$. This determination may be made in any suitable way. For example, in some aspects of the technology, the language model may be configured to process the fine-tuning example as a "cell selection" example if the "no aggregation" option has the highest probability value, and to process the fine-tuning example as a "scalar answer" example if one of the other aggregation options has the highest probability value. In some aspects of the technology, the language model may be configured to sum the probability values for all aggregation options other than the "no aggregation" option, and to only process the fine-tuning example as a "scalar answer" example if that sum is higher than the probability for the "no aggregation" option. In some aspects of the technology, the language model may be configured to only process the fine-tuning example as a "cell selection" example if the probability of the "no aggregation" option is higher than some predetermined threshold value (e.g., 0.25, 0.3, 0.5, etc.). In this regard, the language model may be configured to use a different criteria for determining whether to process an ambiguous example as a "cell selection" example or a "scalar answer" example during fine-tuning than it will use during inference. For example, the language model may be configured to employ a predetermined threshold during fine-tuning, but may be configured to simply select the aggregation option with the highest probability during inference.

In step 906, the fine-tuning example is processed according to method 600 of FIG. 6 or method 700 of FIG. 7 based on the determination of step 904. In that regard, when the language model reaches step 606 of FIG. 6 or step 702 of FIG. 7, it will be understood that the language model may be configured to reuse the probability values $p_a(op_i)$ that were generated in step 902 rather than regenerating them.

Additional Pre-Training

In some aspects of the technology, the neural-network-based language model resident on processing system 102 may be pre-trained using a collection of the masked-language modeling examples described above with respect to FIGS. 2, 3A, and 3B, as well as using examples based on counterfactual statements. The pre-training examples based on counterfactual statements may also be automatically retrieved and/or generated by the processing system 102, allowing this additional pre-training to also proceed unsupervised.

Figure 10:
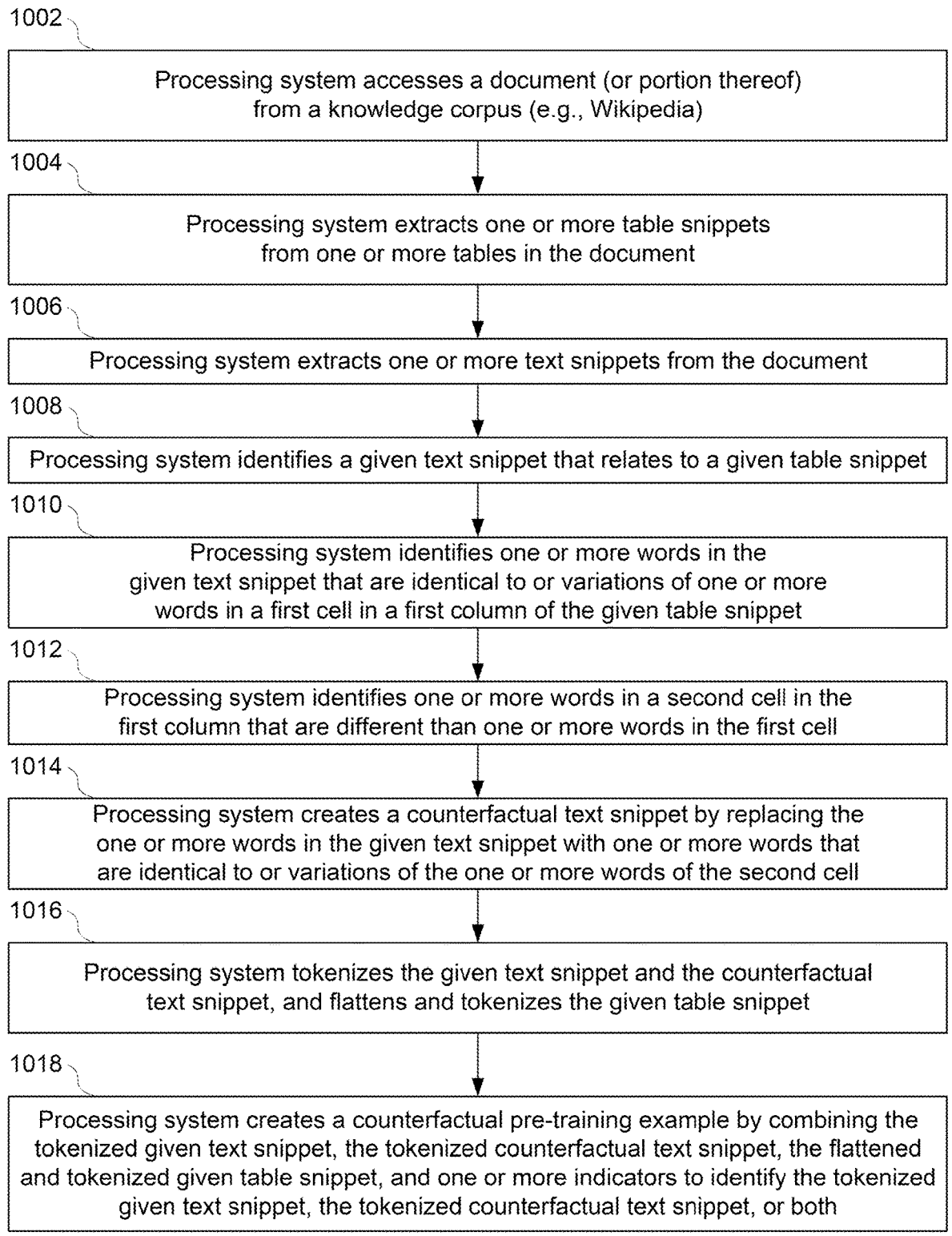
FIG. 10 is a flow diagram of an exemplary method of generating a text-based counterfactual pre-training example, in accordance with aspects of the disclosure.

FIG. 10 is a flow diagram of an exemplary process 1000 that may be followed by the processing system to generate a text-based counterfactual pre-training example, in accordance with aspects of the disclosure.

In step 1002, the processing system accesses a document from a knowledge corpus. As in step 202 of FIG. 2, the knowledge corpus may be resident on a remote processing system (e.g., websites 110 or 118, a networked storage device, etc.), or may be stored locally. Likewise, the term "document" may again refer to a whole document or some portion thereof. Thus, for example, the knowledge corpus may be an online encyclopedia such as Wikipedia, and the retrieved document may be a complete HTML page for a given entry, or a selected section or sections of the page containing one or more tables and text. In some aspects of the technology, the processing system may be configured to select a document with a table having a number of cells below a predetermined threshold (e.g., 10 cells, 100 cells, 500 cells, 1000 cells, etc.). In some aspects, the processing system may be configured to select only documents with tables that have a header (e.g., as identified by a header tag such as "<th>").

In step 1004, the processing system extracts one or more table snippets from one or more tables in the document. For example, in some aspects of the technology, the processing system may extract only selected columns and/or rows of the table. In some aspects, the processing system may be configured to limit the size of each table snippet to a predetermined number of wordpieces, and thus may limit the number of cells harvested, and/or the number of words harvested from each selected column name, row name, and/or cell in order to create a snippet that does not exceed that predetermined size. In addition, in some aspects of the technology, a table snippet may comprise an entire table.

In step 1006, the processing system extracts one or more snippets of text from the document. Here as well, text snippets may be any suitable length (e.g., 4, 8, 16, 32, 64, 128 wordpieces), and may be extracted from any suitable portion of the document that may contain information related to the one or more tables contained in the document. For example, in some aspects of the technology, the processing system may be configured to extract snippets from the document title (e.g., Wikipedia article title), the first sentence or paragraph of text of the document, the document description (e.g., Wikipedia's "short description," which appears at the top of each page under the title), the table captions for any tables in the document, the title of any chapter or segment in which a table is located in the document, and/or the text of any such chapter or segment, etc. The processing system may also be configured to extract snippets from any portion of the document that links to a given table.

In step 1008, the processing system identifies a given text snippet (of the one or more text snippets) that relates to a given table snippet (of the one or more table snippets). The processing system may identify such relationships in any suitable way. For example, in some aspects of the technology, the processing system may be configured to identify a given related text snippet based on it being linked to the table snippet (e.g., as a hyperlinked footnote to a cell in the text snippet). In some aspects of the technology, the processing system may be configured to identify a given related text snippet based on it including one or more words (or known variants thereof such as plurals, singulars, different tenses, past participles, abbreviations, etc.) that are also included in at least one cell of the table snippet. For example, the processing system may be configured to identify the text snippet 302 of FIG. 3A as being related to table snippet 304 of FIG. 3A based on the word "breeds" being included in the text snippet 302 and its related singular form "breed" being included in the table snippet 304. In some aspects of the technology, the processing system may be configured to identify a given related text snippet based on it including words (or known variants thereof) that are included in at least two different cells in a single row or column of the table snippet. For example, the processing system may be configured to identify a text snippet of "The Labrador Retriever weighs on average 80 pounds" as relating to table 502 of FIG. 5A based on the text snippet containing text found in both the second column ("Labrador Retriever") and third column ("80") of the second row of table 502.

In step 1010, the processing system identifies one or more words in the given text snippet that are identical to or variations of one or more words in a first cell in a first column of the given table snippet. Thus, using the same example discussed above in which the processing system is presented a text snippet of "The Labrador Retriever weighs on average 80 pounds," it may identify the words "Labrador Retriever" in the text snippet as being identical to contents of the cell in the second column and second row of table 502 of FIG. 5A. Here as well, the processing system may identify word variations based on any suitable criteria. For example, a variation of a given word may be its plural or singular form, a different tense of the word (walk, walked, walking), an abbreviation (United States, U.S.), a known alternative spelling (aluminum, aluminium), a form that shares a root of the given word with a different prefix or ending (Australia, Australian), etc. Thus, if the text snippet was instead "Labrador Retrievers weigh on average 80 pounds," the processing system may still identify the words "Labrador Retrievers" in the text snippet, given that they are a variation (a plural form) of the words "Labrador Retriever" found in the cell in the second column and second row of table 502 of FIG. 5A.

In step 1012, the processing system identifies one or more words in a second cell in the first column that are different than one or more words in the first cell. Thus, using the same example discussed above in which the processing system first identifies the one or more words "Labrador Retriever" in the cell in the second column and second row of table 502 of FIG. 5A, the processing system may in this step identify that the words "German Shepherd" found in the cell in the second column and third row of table 502 are different. In that regard, in some aspects of the technology, the processing system may be further configured to ignore words in a second cell that happen to be mere variations of the one or more words of the first cell. For example, the processing system may be configured to ignore a second cell that included a plural form of the words of the first cell.

In addition, in some aspects of the technology, the processing system may be configured to identify further words in the text snippet that are identical to or variations of words in another column of the first row. For example, using the text snippet "The Labrador Retriever weighs on average 80 pounds," the processing system may identify that the words "Labrador Retriever" are found in both the text snippet and the second column and second row of table 502 of FIG. 5A, and may further identify that the text "80" is found in both the text snippet and the third column of the second row of table 502. In such a case, the processing system may be configured to identify the cell listing "German Shepherd" not only based on its content being different than what is in the second row of the second column, but also based on "German Shepherd" coming from a row (the third row) which lists a different value in its third column ("85") than what is listed in the second row ("80"). As will be appreciated, this can strengthen the likelihood that replacing the words "Labrador Retriever" in the text snippet with the words "German Shepherd" will result in a statement that changes from being true to being untrue. For example, if table 502 listed the same value of "80" for both the second and third rows of the third column, then changing the text snippet from "The Labrador Retriever weighs on average 80 pounds" to "The German Shepherd weighs on average 80 pounds" would simply form a second true statement.

In step 1014, the processing system creates a counterfactual text snippet by replacing the one or more words in the given text snippet with one or more words that are identical to or variations of the one or more words of the second cell. Thus, using the same example discussed above in which the processing system selects the words "Labrador Retriever" from the text snippet "The Labrador Retriever weighs on average 80 pounds," and selects the words "German Shepherd" in the cell in the second column and third row of table 502, it will create a counterfactual statement of "The German Shepherd weighs on average 80 pounds." Likewise, using the alternative example in which the processing system selects the words "Labrador Retrievers" in the text snippet "Labrador Retrievers weigh on average 80 pounds," it may be configured to identify the words "German Shepherd" in the cell in the second column and third row of table 502, but to use a plural variation of those words so that the counterfactual statement remains grammatically correct and becomes "German Shepherds weigh on average 80 pounds."

In step 1016, the processing system tokenizes the given text snippet and counterfactual text snippet, and flattens and tokenizes the given table snippet. This may be done in any suitable way, as described above with respect to steps 206 and 210 of FIG. 2.

In step 1018, the processing system creates a counterfactual pre-training example by combining the tokenized given text snippet, the tokenized counterfactual text snippet, the flattened and tokenized given table snippet, and one or more indicators to identify the tokenized given text snippet, the tokenized counterfactual text snippet, or both. These may be combined in any suitable way. For example, in some aspects of the technology, the processing system may be configured to concatenate each listed item in a predetermined order, and may be further configured to insert separator tokens between each item.

Figure 11:
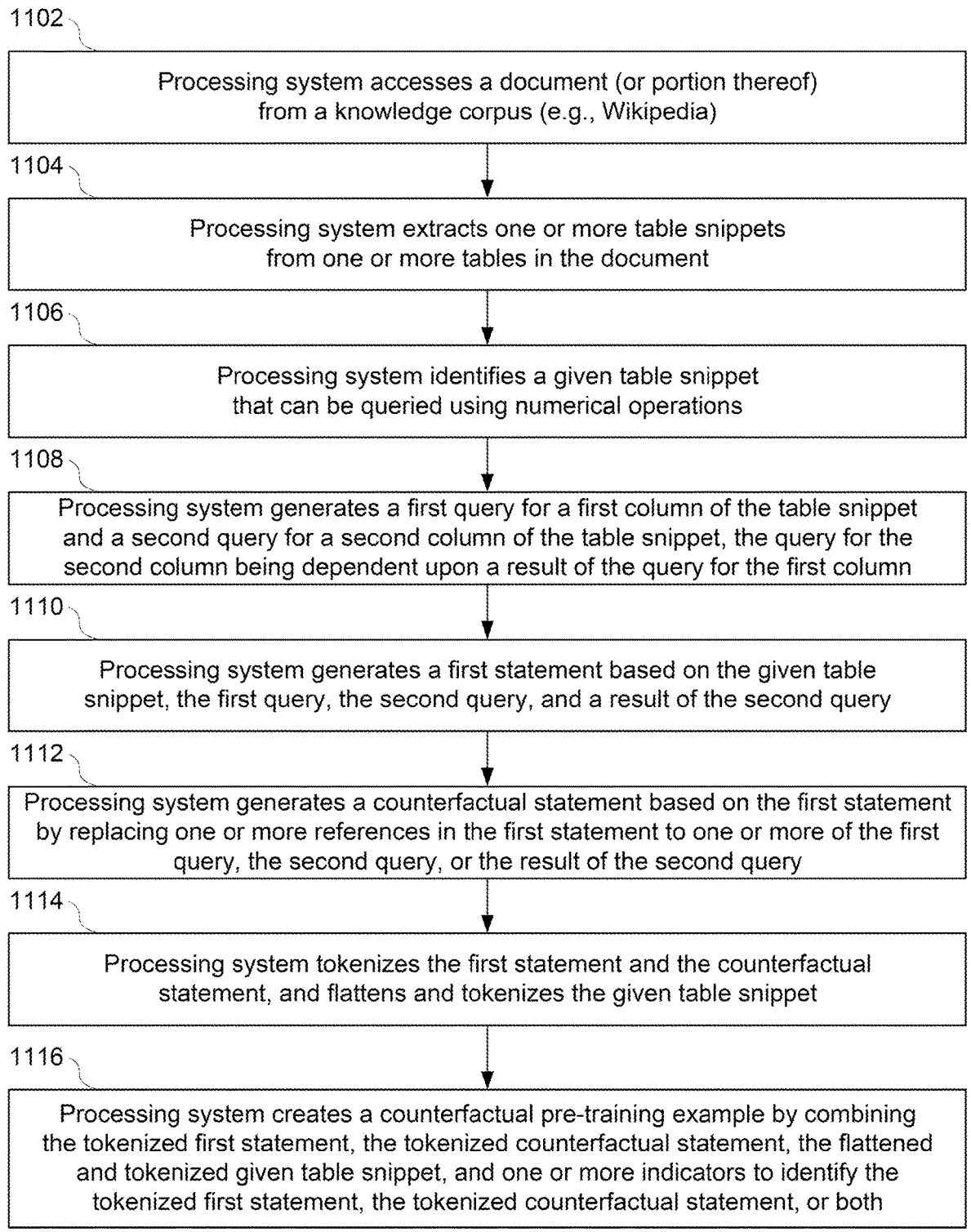
FIG. 11 is a flow diagram of an exemplary method of generating a query-based counterfactual pre-training example, in accordance with aspects of the disclosure.

FIG. 11 is a flow diagram of an exemplary process 1100 that may be followed by the processing system to generate a query-based counterfactual pre-training example, in accordance with aspects of the disclosure.

In steps 1102 and 1104, the processing system accesses a document from a knowledge corpus, and extracts one or more table snippets from one or more tables in the document as described above with respect to steps 1002 and 1004 of FIG. 10.

In step 1106, the processing system identifies a given table snippet (of the one or more table snippets) that can be queried using numerical operations. For example, the processing system may identify a table snippet with columns consisting of numbers that can be queried using an aggregation operation such as the count, sum, or average operations discussed above. Further in that regard, the processing system may be configured to identify and ignore one or more header rows or columns in making this determination. Thus, the processing system may identify table 502 of FIG. 5A based on its first and third columns containing numbers in all but their header rows.

In step 1108, the processing system generates a first query for a first column of the table snippet and a second query for a second column of the table snippet, the query for the second column being dependent upon a result of the query for the first column. Thus, assuming that the table snippet is table 502 of FIG. 5A, the processing system may generate a first query based on a search query using the term "retriever" in the "breed" column (column 2). That query will return results in row 2 ("Labrador Retriever") and row 4 ("Golden Retriever"). The processing system may then generate a second query using the "sum" aggregation operation in the "average weight (lbs)" column (column 3) and limited to rows 2 and 4. That query will sum the values 80 and 75 to return a result of 155.

In step 1110, the processing system generates a first statement based on the given table snippet, the first query, the second query, and a result of the second query. The processing system may be configured to generate this first statement in any suitable way. For example, the processing system may be configured to use one or more words from one or more header rows or columns of the table snippet. Likewise, the processing system may be configured to use one or more predetermined words to indicate the relationship between the queries, to link the queries to their respective columns or rows of the table, to link a given query with its result, etc. Thus, assuming the same exemplary first and second queries discussed in step 1108, the processing system may be configured to use the words "contains the term" based on the first query being a search query. Likewise, the processing system may be configured to use the words "when the" to indicate the conditional relationship between the result of the second query and the result of the first query. This may lead to, for example, the processing system generating a statement using the following template: "The [type of second query] of the [name of second column] when the [name of first column] contains the term [subject of first query] is [result of second query]." In this example, the first column is the "breed" column (column 2), the second column is the "average weight (lbs)" column (column 3), the subject of the first query is "retriever," the query type for the second query is "sum," and the result of the second query is 155. Thus, using this exemplary template, the processing system would generate a first statement of "The sum of the average weight (lbs) when the breed contains the term retriever is 155."

In step 1112, the processing system generates a counterfactual statement based on the first statement by replacing one or more references in the first statement to one or more of the first query, the second query, or the result of the second query. Here as well, the processing system may be configured to generate the counterfactual statement in any suitable way. For example, the processing system may replace a reference to the result of the second query to a randomly generated value, e.g., the processing system may change "The sum of the average weight (lbs) when the breed contains the term retriever is 155" to "The sum of the average weight (lbs) when the breed contains the term retriever is 100." Likewise, the processing system may replace a reference to the type of the second query to another known query type, e.g., the processing system may change "The sum of the average weight (lbs) when the breed contains the term retriever is 155" to "The average of the average weight (lbs) when the breed contains the term retriever is 155." Likewise, the processing system may replace a reference to the subject of the first query to another value from the first column, e.g., the processing system may change "The sum of the average weight (lbs) when the breed contains the term retriever is 155" to "The sum of the average weight (lbs) when the breed contains the term german is 155."

In step 1114, the processing system tokenizes the first statement and the counterfactual statement, and flattens and tokenizes the given table snippet in the same way describe above with respect to step 1016 of FIG. 10.

In step 1116, the processing system creates a counterfactual pre-training example by combining the tokenized first statement, the tokenized counterfactual statement, the flattened and tokenized given table snippet, and one or more indicators to identify the tokenized first statement, the tokenized counterfactual statement, or both. Here as well, these may be combined in any suitable way as described above with respect to step 1018 of FIG. 10. Thus, for example, in some aspects of the technology, the processing system may be configured to concatenate each listed item in a predetermined order, and may be further configured to insert separator tokens between each item.

Figure 12:
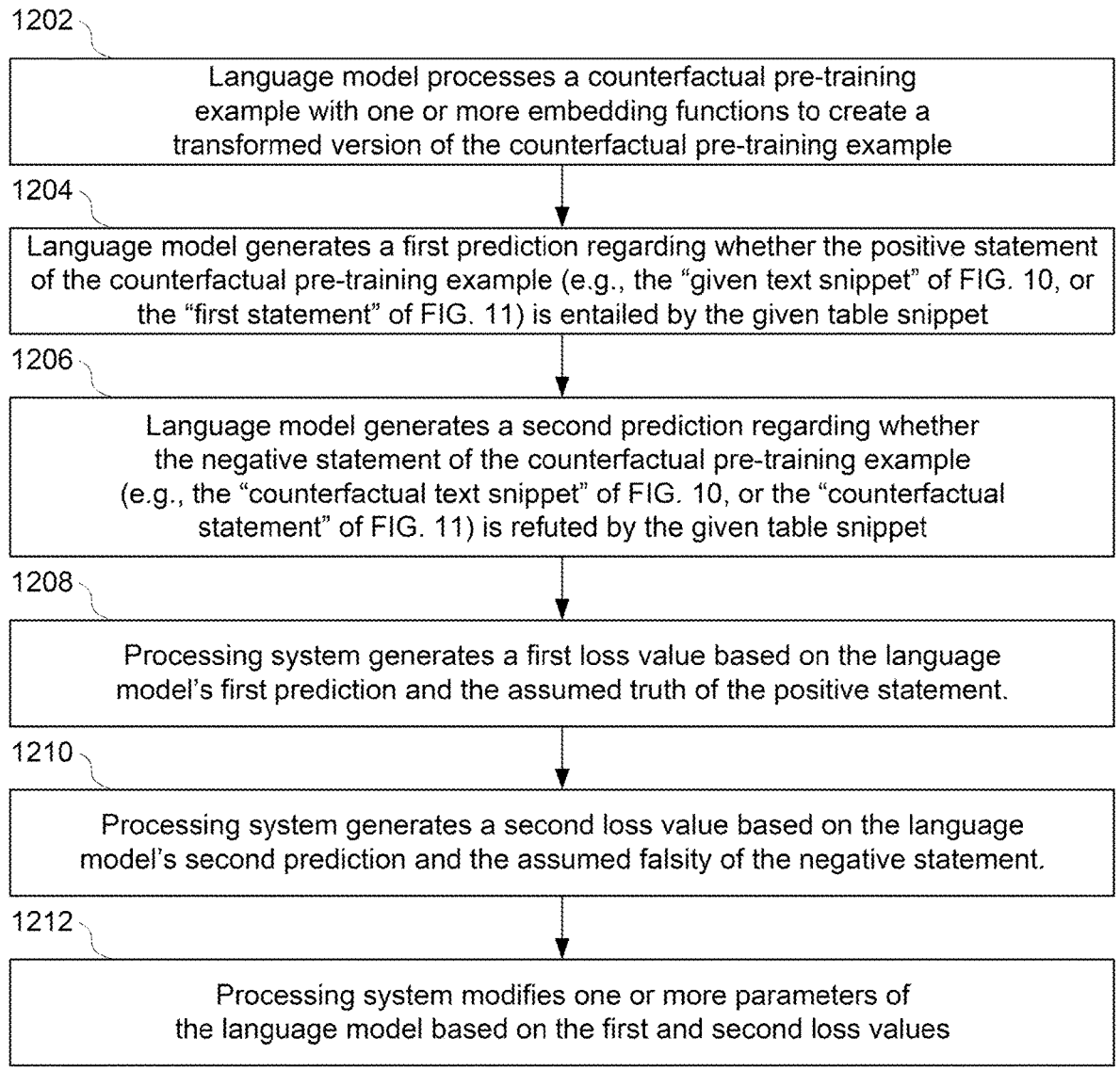
FIG. 12 is a flow diagram of an exemplary of pre-training a language model using examples based on counterfactual examples, in accordance with aspects of the disclosure.

FIG. 12 is a flow diagram of an exemplary process 1200 that may be followed by the processing system to pre-train the language model using examples based on counterfactual examples, in accordance with aspects of the disclosure.

In step 1202, once the processing system provides a counterfactual pre-training example (e.g., as generated according to FIG. 10 or FIG. 11) to the language model, the language model will initially process the counterfactual pre-training example with one or more embedding functions in order to create a transformed version of the counterfactual pre-training example that includes a vector for each token. The language model may process the tokens of the counterfactual pre-training example using the same embedding functions shown and described above with respect to FIG. 3B.

In steps 1204 and 1206, the language model uses the transformed version of the counterfactual pre-training example as an entailment task. In that regard, as shown in step 1204, the language model generates a first prediction regarding whether the positive statement (e.g., the "given text snippet" of FIG. 10, or the "first statement" of FIG. 11) is entailed by the given table snippet. Likewise, as shown in step 1206, the language model generates a second prediction regarding whether the negative statement (e.g., the "counterfactual text snippet" of FIG. 10, or the "counterfactual statement" of FIG. 11) is refuted by the given table snippet.

In step 1208, the processing system generates a first loss value based on the language model's first prediction and the assumed truth of the positive statement. This truth can be assumed based on the identification of the positive and/or negative statements which are included in the counterfactual pre-training example, as noted above with respect to steps 1018 and 1116 of FIGS. 10 and 11. The processing system may use any suitable loss function to generate the first loss value, such as a cross-entropy loss value based on the language model's first prediction and the assumed truth of the positive statement.

In step 1210, the processing system generates a second loss value based on the language model's second prediction and the assumed falsity of the negative statement. This falsity can be assumed based on the identification of the positive and/or negative statements which are included in the counterfactual pre-training example, as noted above with respect to steps 1018 and 1116 of FIGS. 10 and 11. The processing system may also use any suitable loss function to generate the second loss value, such as a cross-entropy loss value based on the language model's second prediction and the assumed falsity of the negative statement.

In step 1212, the processing system modifies one or more parameters of the language model based on the first and second loss values (or a total loss value based thereon). As mentioned above with respect to pre-training using masked language modeling tasks, this back-propagation step may be done at any suitable interval. In that regard, in some aspects of the technology, the processing system may be configured to calculate the first and second loss values and tune the parameters of the language model immediately after each counterfactual pre-training example. In some aspects of the technology, the processing system may be configured to batch multiple counterfactual pre-training examples. In such a case, the processing system may be configured to combine (e.g., sum or average) the loss values calculated during each counterfactual pre-training example in the batch, apply the combined loss value during a back-propagation phase following the conclusion of the batch, and then calculate a new combined loss value during the next batch of counterfactual pre-training examples.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method of training a natural language processing (NLP) model, comprising:
    fine-tuning the NLP model, by one or more processors of a processing system, based on a plurality of fine-tuning examples each comprising a respective question, a respective answer, and a corresponding table, the fine-tunning including:
        generating, by the one or more processors, an estimated answer to the respective question of a fine-tuning example of the plurality of fine-tuning examples based on:
            the corresponding table of the fine-tuning example;
            one or more first predictions, by the NLP model, whether the respective answer is based on each cell of a plurality of cells of the corresponding table, the respective answer being scalar; and
            one or more second predictions, by the NLP model, whether the respective answer is based on each aggregation operation of a plurality of aggregation operations;
        generating, by the one or more processors, a first loss value based on the estimated answer;
        generating, by the one or more processors, a second loss value based on the one or more second predictions; and
        modifying, by the one or more processors, one or more parameters of the NLP model based at least on the first and second loss values,
    wherein the fine-tuned NLP model is configured to, responsive to a user query, reason directly over tables to provide an answer to the user query.

2. The method of claim 1, wherein the fine-tuning example is a first fine-tuning example of the plurality of fine-tuning examples, and the fine-tuning further includes, for a second fine-tuning example of the plurality of fine-tuning examples having the respective answer occurring in a cell of the corresponding table:
    generating, by the one or more processors, a third loss value based on a third prediction, by the NLP model, whether the respective answer is in a single cell of the corresponding table;
    generating, by one or more processors, a fourth loss value based on one or more fourth predictions of whether each cell of the plurality of cells of the corresponding table contains the respective answer to the respective question; and
    modifying, by one or more processors, the one or more parameters of the NLP model based at least on the third and fourth loss values.

3. The method of claim 2, wherein the plurality of cells of the corresponding table is all cells of the corresponding table, or all cells of a given column of the corresponding table.

4. The method of claim 2, wherein, for the second fine-tuning example, the fine-tuning further includes:
    generating, by the one or more processors, a fifth loss value based on a fifth prediction whether the respective answer to the respective question is in a single column of the corresponding table; and
    modifying, by the one or more processors, the one or more parameters of the NLP model based at least on the third, fourth, and fifth loss values.

5. The method of claim 2, wherein, for a third fine-tuning example of the plurality of fine-tuning examples having the respective answer being scalar and occurring in a cell of the corresponding table, the fine-tuning further includes:
    generating, by the one or more processors using the NLP model, a fifth prediction whether the respective answer is in a single cell of the corresponding table;
    generating, by the one or more processors using the NLP model, one or more sixth predictions whether the respective answer is based on each aggregation operation of the plurality of aggregation operations; and
    determining, based on the fifth prediction and the one or more sixth predictions, whether to generate:
        a sixth loss value based on the fifth prediction; and
        a seventh loss value based on one or more seventh predictions, by the NLP model, whether each cell of the plurality of cells of the corresponding table contains the respective answer to the respective question.

6. The method of claim 5, further comprising generating the sixth loss value and the seventh loss value in response to determining that the fifth prediction is either:
greater than each of the one or more sixth predictions; or
is greater than a sum of the one or more sixth predictions.

7. The method of claim 5, further comprising generating the sixth loss value and the seventh loss value in response to determining that the fifth prediction is greater than a predetermined threshold value.

8. The method of claim 1, further comprising:
generating, by the one or more processors, a plurality of masked language modeling tasks each comprising a different respective table, a portion of text from a document, and one or more mask tokens.

9. The method of claim 8, further comprising, for a given masked language modeling task of the plurality of masked language modeling tasks:
generating, by the one or more processors, a masked language modeling loss value based on one or more third predictions, by the NLP model, regarding each mask token of the given masked language modeling task; and
modifying, by the one or more processors, the one or more parameters of the NLP model based at least on the masked language modeling loss value.

10. The method of claim 1, further comprising:
generating, using the one or more processors, a plurality of counterfactual examples each comprising a respective table, a respective first statement, and a respective second statement.

11. The method of claim 10, further comprising:
generating, by the one or more processors, a positive statement loss value based on a third prediction, by the NLP model, whether the respective first statement is entailed in the respective table;
generating, by the one or more processors, a negative statement loss value based on a fourth prediction whether the respective second statement is refuted by the respective table; and
modifying, by the one or more processors, the one or more parameters of the NLP model based at least on the positive statement loss value and the negative statement loss value.

12. A processing system for training a natural language processing (NLP) model, comprising:
a memory; and
one or more processors coupled to the memory and configured to fine-tune the NLP model based on a plurality of fine-tuning examples each comprising a respective question, a respective answer, and a corresponding table, wherein, to fine-tune the NLP model, the one or more processors are further configured to:
generate an estimated answer to the respective question of a fine-tuning example of the plurality of fine-tuning examples based on:
the corresponding table;
one or more first predictions, by the NLP model, whether the respective answer of the fine-tuning example is based on each cell of a plurality of cells of the corresponding table, the respective answer being scalar; and
one or more second predictions, by the NLP model, whether the respective answer is based on each aggregation operation of a plurality of aggregation operations;
generate a first loss value based on the estimated answer;
generate a second loss value based on the one or more second predictions; and
modify one or more parameters of the NLP model based at least on the first and second loss values,
wherein the fine-tuned NLP model is configured to, responsive to a user query, reason directly over tables to provide an answer to the user query.

13. The processing system of claim 12, wherein the fine-tuning example is a first fine-tuning example of the plurality of fine-tuning examples, and
wherein, to fine-tune the NLP model, the one or more processors are further configured to, for a second fine-tuning example of the plurality of fine-tuning examples having the respective answer occurring in a cell of the corresponding table:
generate a third loss value based on a third prediction, by the NLP model, whether the respective answer is in a single cell of the corresponding table;
generate a fourth loss value based on one or more fourth predictions, by the NLP model, whether each cell of the plurality of cells of the corresponding table contains the respective answer; and
modify the one or more parameters of the NLP model based at least on the third and fourth loss values.

14. The processing system of claim 13, wherein the plurality of cells of the corresponding table is all cells of the corresponding table, or all cells of a given column of the corresponding table.

15. The processing system of claim 13, wherein, to fine-tune the NLP model, the one or more processors are further configured to, for the second fine-tuning example:
generate a fifth loss value based on a fifth prediction, by the NLP model, whether the respective answer to the respective question is in a single column of the corresponding table; and
modify the one or more parameters of the NLP model based at least on the third, fourth, and fifth loss values.

16. The processing system of claim 13, wherein, to fine-tune the NLP model, the one or more processors are further configured to, for a third fine-tuning example of the plurality of fine-tuning examples having the respective answer being scalar and occurring in a cell of the corresponding table:
generate, using the NLP model, a fifth prediction whether the respective answer is in a single cell of the corresponding table;
generate, using the NLP model, one or more sixth predictions whether the respective answer is based on each aggregation operation of the plurality of aggregation operations; and
determine, based on the fifth prediction and the one or more sixth predictions, whether to generate:
a sixth loss value based on the fifth prediction; and
a seventh loss value based on one or more seventh predictions whether each cell of the plurality of cells of the corresponding table contains the respective answer.

17. The processing system of claim 16, wherein, to fine-tune the NLP model, the one or more processors are further configured to generate the sixth loss value and the seventh loss value in response to a determination that the fifth prediction is either:
  greater than each of the one or more sixth predictions; or
  is greater than a sum of the one or more sixth predictions.

18. The processing system of claim 16, wherein, to fine-tune the NLP model, the one or more processors are further configured to generate the sixth loss value and the seventh loss value in response to a determination that the fifth prediction is greater than a predetermined threshold value.

19. The processing system of claim 12, wherein the one or more processors are further configured to:
  generate a plurality of masked language modeling tasks each comprising a different respective table, a portion of text from a document, and one or more mask tokens.

20. The processing system of claim 19, wherein the one or more processors are further configured to, for a given masked language modeling task of the plurality of masked language modeling tasks:
  generate a masked language modeling loss value based on one or more third predictions, by the NLP model, regarding each mask token of the given masked language modeling task; and
  modify the one or more parameters of the NLP model based at least on the masked language modeling loss value.

21. The processing system of claim 12, wherein the one or more processors are further configured to:
  generate a plurality of counterfactual examples each comprising a respective table, a respective first statement, and a respective second statement.

22. The processing system of claim 21, wherein the one or more processors are further configured to:
  generate a positive statement loss value based on a third prediction, by the NLP model, whether the respective first statement is entailed in the respective table;
  generate a negative statement loss value based on a fourth prediction, by the NLP model, whether the respective second statement is refuted by the respective table; and
  modify the one or more parameters of the NLP model based at least on the positive statement loss value and the negative statement loss value.

* * * * *